US010212695B2

(12) United States Patent
Gupta

(10) Patent No.: US 10,212,695 B2
(45) Date of Patent: *Feb. 19, 2019

(54) MOBILE TERMINATION CONTROL TECHNIQUES TO SUPPORT EMBMS

(71) Applicant: INTEL IP CORPORATION, Santa Clara, CA (US)

(72) Inventor: Vivek Gupta, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,826

(22) Filed: Nov. 27, 2017

(65) Prior Publication Data

US 2018/0084528 A1    Mar. 22, 2018

Related U.S. Application Data

(63) Continuation of application No. 14/752,740, filed on Jun. 26, 2015, now Pat. No. 9,832,756.

(60) Provisional application No. 62/107,688, filed on Jan. 26, 2015.

(51) Int. Cl.
*H04W 72/00* (2009.01)
*H04W 4/06* (2009.01)

(52) U.S. Cl.
CPC ........... *H04W 72/005* (2013.01); *H04W 4/06* (2013.01)

(58) Field of Classification Search
CPC ...................................................... H04L 12/50
USPC ............................................................ 370/329
See application file for complete search history.

(56) References Cited

U.S. PATENT DOCUMENTS

| 9,832,756 | B2* | 11/2017 | Gupta ..................... H04W 4/06 |
| 2010/0157872 | A1 | 6/2010 | Hyun et al. |
| 2012/0263089 | A1 | 10/2012 | Gupta et al. |
| 2017/0325057 | A1* | 11/2017 | Zhang ..................... H04W 4/02 |

OTHER PUBLICATIONS

Supplementary European Search Report for European Patent Application No. 15880644, dated Jun. 6, 2018, 2 pages.

* cited by examiner

*Primary Examiner* — Dang T Ton

(57) ABSTRACT

Mobile termination control techniques to support eMBMS are described. In one embodiment, for example, an apparatus may comprise logic, at least a portion of which is in hardware, the logic to send a first AT command to enable evolved Multimedia Broadcast Multicast Service (eMBMS) support at a mobile termination (MT), send a second AT command to query the MT regarding eMBMS services available for use by the MT, receive information describing one or more available eMBMS services in response to the second AT command, and send a third AT command to configure the MT to use at least one of the one or more available eMBMS services. Other embodiments are described and claimed.

25 Claims, 14 Drawing Sheets

Defined values

<n>: integer type; provides an option to control the unsolicited presentation on TE/MT.

0 disable eMBMS unsolicited result code 1 enable eMBMS unsolicited result code

<embms_service>: integer type; provides an option to query and configure eMBMS services. The MT should use the value 4 as the default value.

0 query eMBMS services available for use by the MT 1 query eMBMS services being used by the MT 2 configure eMBMS service for use by the MT 3 deconfigure eMBMS service for use by the MT 4 keep current configuration of eMBMS services used by the MT <service_type>: integer type; indicates whether the eMBMS service is available for use or is being used by the mobile 0 eMBMS service available for use by the MT 1 eMBMS service being used by the MT <no_services_info>: integer type; number of eMBMS services for which information is reported for a particular <service_type>

<tmgi>: string type in hex format; value is the Temporary Mobile Group Identity allocated to a particular eMBMS bearer service. Refer 3GPP TS 24.008 [8], subclause 10.5.6.13.

<embms_session_id>: integer type; value is the optional MBMS Session Identity, which together with TMGI identifies a specific MBMS session. Refer 3GPP TS 29.061 [39], subclause 17.7.11.

MOBILE TERMINATION CONTROL TECHNIQUES TO SUPPORT EMBMS

CROSS-REFERENCE TO RELATED APPLICATION

This application is a continuation of, claims the benefit of and priority to, previously filed U.S. patent application Ser. No. 14/752,740 entitled "MOBILE TERMINATION CONTROL TECHNIQUES TO SUPPORT EMBMS" filed on Jun. 26, 2015, which claims the benefit of and priority to, previously filed U.S. Provisional Patent Application Ser. No. 62/107,688 entitled "AT COMMANDS FOR eMBMS" filed on Jan. 26, 2015, the subject matter of which are hereby incorporated by reference in their entireties.

TECHNICAL FIELD

Embodiments herein generally relate to communications between devices in broadband wireless communications networks.

BACKGROUND

Evolved Multimedia Broadcast Multicast Service (eMBMS) is a unidirectional point-to-multipoint service in which data is transmitted from a single source entity to a group of users in a specific area. eMBMS services are transmitted on the same carrier frequencies used by mobile operators to provide other typical services such as voice calls and internet connectivity. Various types of eMBMS services can be provided, such as mobile television services, streaming services, and file download services, for example.

BRIEF DESCRIPTION OF THE DRAWINGS

FIG. 7B illustrates an embodiment of a defined value set.

DETAILED DESCRIPTION

Figure 1:
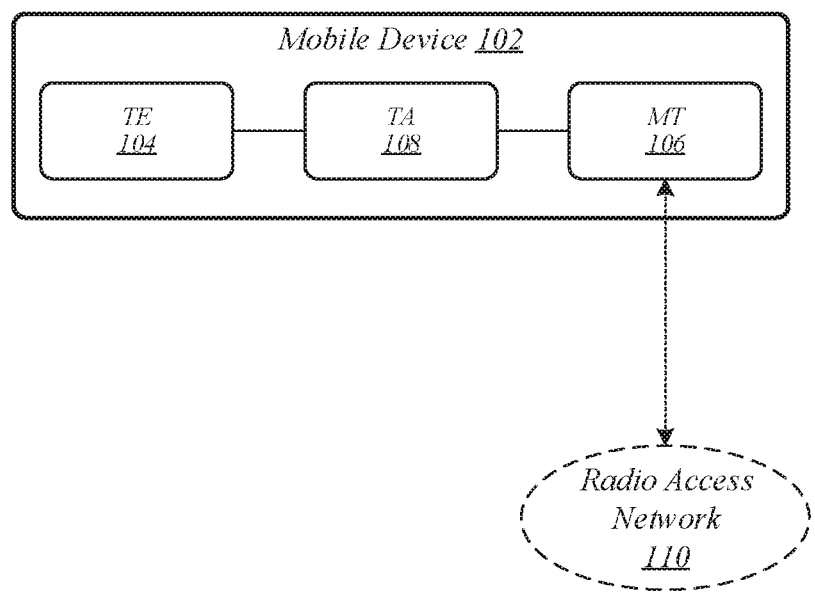
FIG. 1 illustrates an embodiment of a first operating environment.

Various embodiments may be generally directed to mobile termination control techniques to support eMBMS. In one embodiment, for example, an apparatus may comprise logic, at least a portion of which is in hardware, the logic to send a first AT command to enable evolved Multimedia Broadcast Multicast Service (eMBMS) support at a mobile termination (MT), send a second AT command to query the MT regarding eMBMS services available for use by the MT, receive information describing one or more available eMBMS services in response to the second AT command, and send a third AT command to configure the MT to use at least one of the one or more available eMBMS services. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, a mobile device 102 comprises terminal equipment (TE) 104 and mobile termination (MT) 106. TE 104 may generally comprise device(s), logic, circuitry, and/or instructions offering applications and/or services to the user(s) of mobile device 102. MT 106 may generally comprise device(s), logic, circuitry, and/or instructions configured to support radio frequency (RF) communications on the part of mobile device 102. Mobile device 102 also comprises a terminal adapter (TA) 108, which may generally comprise device(s) logic, circuitry, and/or instructions configured to enable communication between TE 104 and MT 106. In operating environment 100, mobile device 102 utilizes capabilities provided by MT 106 to engage in wireless communications with a radio access network (RAN) 110. In some embodiments, mobile device 102 may comprise user equipment (UE), and RAN 110 may comprise an Evolved Universal Mobile Telecommunications System (UMTS) Terrestrial Radio Access Network (E-UTRAN). In conjunction with wireless communication with RAN 110 using capabilities of MT 106, TE 104 may communicate with MT 106 via TA 108 in order to provide data for transmission, control various aspects of the wireless communication, obtain data received by MT 106 via RAN 110, and/or perform other relevant operations. The embodiments are not limited in this context.

Figure 2:
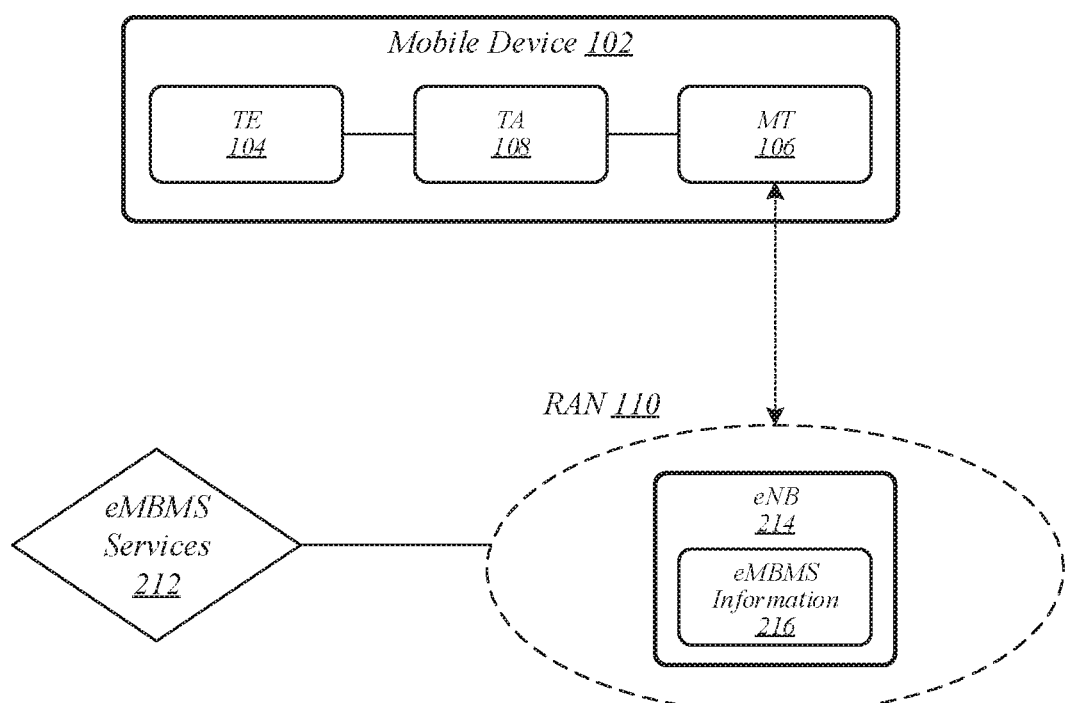
FIG. 2 illustrates an embodiment of a second operating environment.

FIG. 2 illustrates an example of an operating environment 200 that may be representative of various embodiments. In operating environment 200, one or more evolved Multimedia Broadcast Multicast Service (eMBMS) services 212 are available via RAN 110. In order to notify devices within its cell of the availability and/or characteristics of eMBMS services 212, an eNB 214 within RAN 110 transmits eMBMS information 216. In some embodiments, eNB 214 may transmit eMBMS information 216 within a system information block, such as System Information Block 13 (SIB-13). MT 106 may provide mobile device 102 with the wireless communication capabilities needed to receive eMBMS information 216 and obtain eMBMS services 212. In order to be able to make eMBMS services 212 available to the user(s) of mobile device 102, TE 104 needs to be capable of controlling MT 106 in such a way as to properly utilize its wireless communication capabilities to obtain eMBMS services 212. However, according to conventional techniques, no mechanism exists that terminal equipment such as TE 104 may use to control mobile termination such as MT 106 in the manner necessary to enable provision of eMBMS services such as eMBMS services 212 to users of mobile devices such as mobile device 102.

Disclosed herein are mobile termination control techniques to support eMBMS. According to various such techniques, terminal equipment may use AT commands to control mobile termination functions in such a way as to enable the provision of eMBMS services. In some embodiments, the terminal equipment may do so using a set of defined eMBMS-specific AT commands. In various embodiments, the eMBMS-specific AT commands may be designed to be expandable to accommodate new eMBMS feature options and interface protocols, merely by defining new values for various parameters. In some embodiments, the eMBMS-specific AT commands may utilize extended information and error message capabilities described in 3GPP TS 27.007 V12.7.0 (released January 2015) and/or any predecessors, progeny, and/or variants thereof. The embodiments are not limited in this context.

Figure 3:
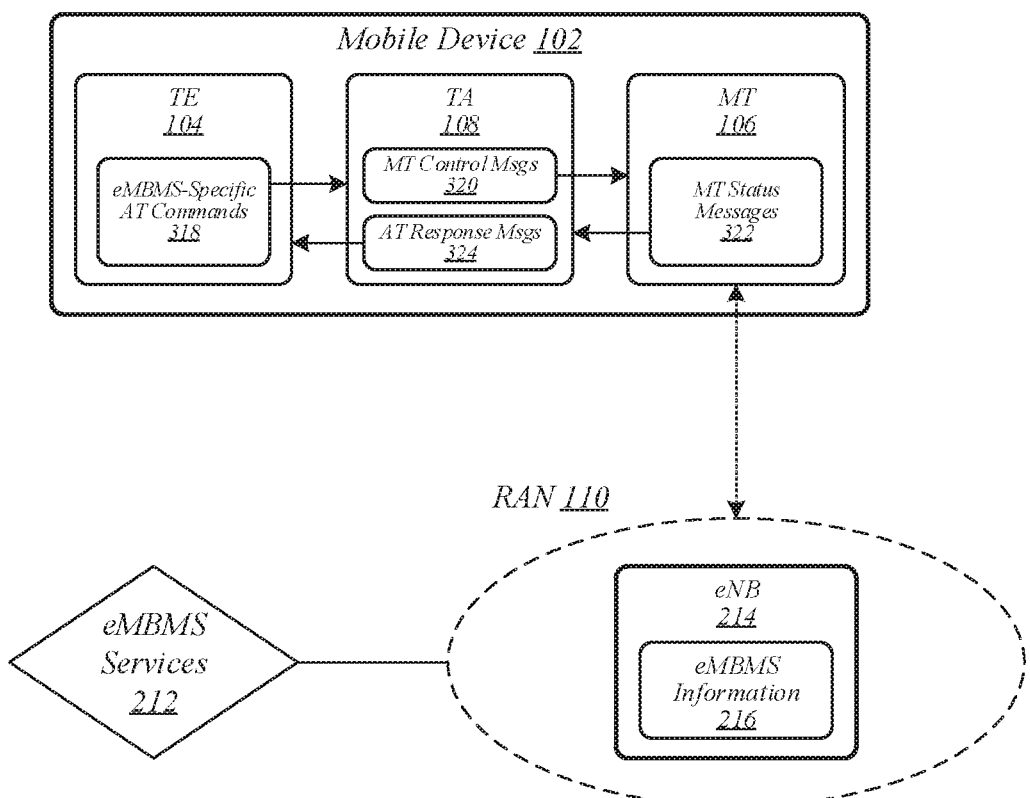
FIG. 3 illustrates an embodiment of a third operating environment.

FIG. 3 illustrates an example of an operating environment 300 that may be representative of the implementation of mobile termination control techniques to support eMBMS in various embodiments. In operating environment 300, TE 104 may be configured to use eMBMS-specific AT commands 318 to enable and configure (or disable) eMBMS support and operations at MT 106, as well as to request reporting of various information relevant to such eMBMS support and/or operations at MT 106. In some embodiments, TE 104 may send such eMBMS-specific AT commands 318 to TA 108, which may send MT control messages 320 to MT 106 in response to the received eMBMS-specific AT commands 318 in order to cause MT 106 to act in response to those eMBMS-specific AT commands 318. In various embodiments, MT 106 may send MT status messages 322 to TA 108 in response to received MT control messages 320. In some embodiments, TA 108 may send AT response messages 324 to TE 104 in order to provide TE 104 with information received from MT 106 within MT status messages 322. In various embodiments, TA 108 may send one or more AT response messages 324 to TE 104 that comprise information responsive to eMBMS-specific AT commands 318 sent by TE 104. In some embodiments, TA 108 may send one or more AT response messages 324 that comprise unsolicited result codes and/or unsolicited service result codes. The embodiments are not limited in this context.

Figure 4:
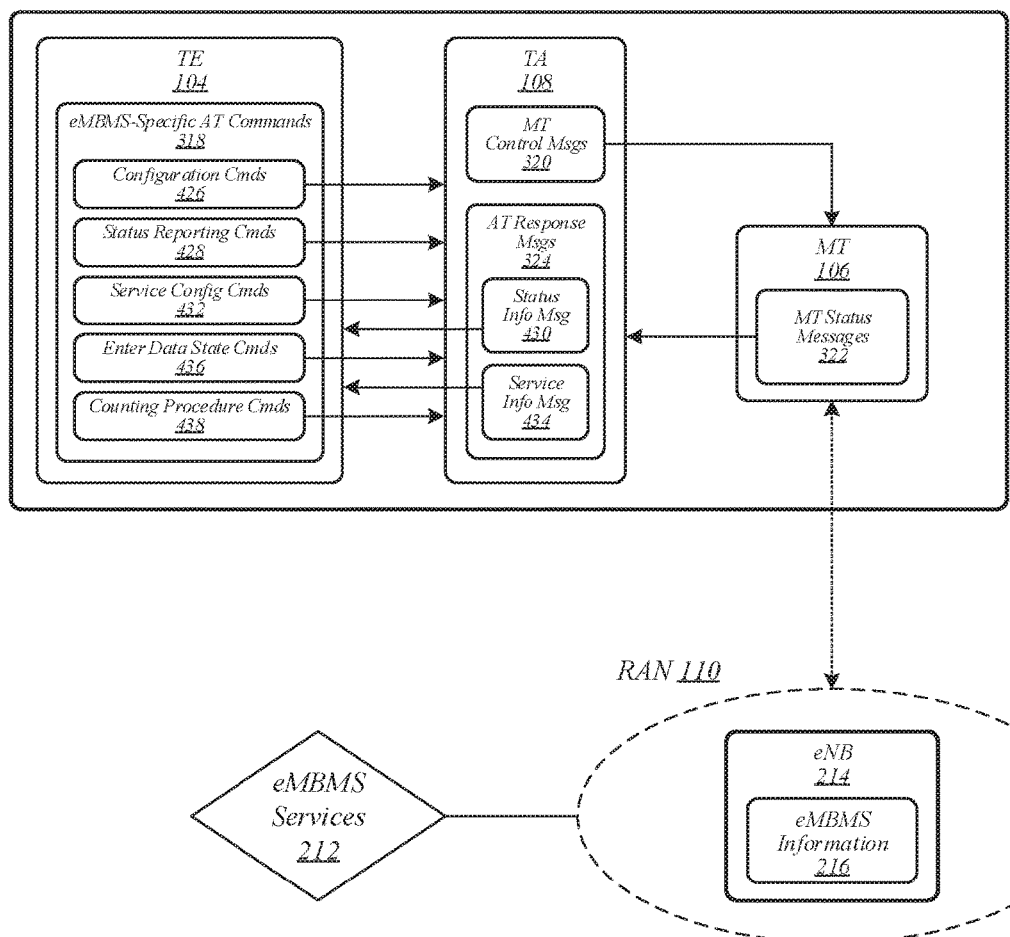
FIG. 4 illustrates an embodiment of a fourth operating environment.

FIG. 4 illustrates an example of an operating environment 400 that may be representative of the implementation of mobile termination control techniques to support eMBMS in various embodiments. More particularly, operating environment 400 depicts examples of various eMBMS-specific AT commands 318 that TE 104 may use to control MT 106 in conjunction with the use of eMBMS services 212. As shown in FIG. 4, in some embodiments, examples of eMBMS-specific AT commands 318 may include configuration commands 426, status reporting commands 428, service configuration commands 432, enter data state commands 436, and counting procedure commands 438. It is to be understood that TE 104 may additionally or alternatively use other types of eMBMS-specific AT commands 318 in various embodiments, and that the embodiments are not limited to these examples.

In some embodiments, one or more of eMBMS-specific AT commands 318 may comprise AT commands for use in order to enable or disable various features and/or reporting functions of MT 106, instruct MT 106 to perform various eMBMS-related operations, query MT 106 for information regarding eMBMS services, configure or de-configure eMBMS services for use by MT 106, and/or provide eMBMS-related information to MT 106. Hereinafter, such AT commands shall be referred to as "set-type" commands. In various embodiments, one or more of eMBMS-specific AT commands 318 may comprise AT commands for use in order to request information identifying particular settings and/or configuration information in effect at MT 106 as a result of previously submitted set-type commands. Hereinafter, such AT commands shall be referred to as "read-type" commands. In some embodiments, one or more of eMBMS-specific AT commands 318 may comprise AT commands for use in order to request information identifying the allowable values for one or more parameters of a set-type command. Hereinafter, such AT commands shall be referred to as "test-type" commands. In various embodiments, one or more of eMBMS-specific AT commands 318 may comprised extended AT commands. The embodiments are not limited in this context.

In some embodiments, TE 104 may use a set-type configuration command 426 to enable and/or disable eMBMS support at MT 106. In various embodiments, TE 104 may set a parameter within that set-type configuration command 426 to one value when using the set-type configuration command 426 to enable eMBMS support at MT 106, and may set the parameter to another value when using the set-type configuration command 426 to disable eMBMS support at MT 106. In some embodiments, if TE 104 sends a set-type configuration command 426 indicating that eMBMS support is to be enabled at MT 106, MT 106 may monitor a multicast control channel (MCCH) for eMBMS control information. In various embodiments, if TE 104 sends a set-type configuration command 426 indicating that eMBMS support is to be disabled at MT 106, MT 106 may refrain from monitoring the MCCH for eMBMS control information. In some embodiments, TE 104 may use a read-type configuration command 426 to request information regarding the current eMBMS configuration settings at MT 106. In various embodiments, TE 104 may use a test-type configuration command 426 to request information identifying supported values for one or more parameters of a set-type configuration command 426. The embodiments are not limited in this context.

In some embodiments, TE 104 may use a set-type status reporting command 428 to specify whether eMBMS session parameter values are to be reported to TE 104. In various embodiments, TE 104 may set a parameter within the set-type status reporting command 428 to one value when using the set-type status reporting command 428 to enable reporting of eMBMS session parameters, and may set the parameter to another value when using the set-type status reporting command 428 to disable reporting of eMBMS session parameters. In some embodiments, the set-type status reporting command 428 may control the presentation of an unsolicited result code via which such parameter values may be reported. In various such embodiments, TE 104 may set a parameter within the set-type status reporting command 428 to one value when using status reporting command 428 to enable presentation of the unsolicited result code, and may set the parameter to another value when using the set-type status reporting command 428 to disable presentation of the unsolicited result code. In some embodiments, TE 104 may use a read-type status reporting command 428 to request information indicating whether reporting of eMBMS session parameters is enabled at MT 106. In various embodiments, the requested information may indicate whether presentation of the unsolicited result code is enabled at MT 106. In some embodiments, TE 104 may use a test-type status reporting command 428 to request information identifying supported values for one or more parameters of a set-type status reporting command 428. The embodiments are not limited in this context.

In various embodiments, after using a set-type status reporting command 428 to enable reporting of eMBMS session parameters, TE 104 may receive a status information message 430 from TA 108. In some embodiments, status information message 430 may comprise status information for one or more eMBMS sessions. In various embodiments, the status information may indicate whether one or more eMBMS sessions are activated or deactivated. In some embodiments, status information message 430 may comprise information that is reported to TE 104 via an unsolicited result code, in response to TE 104 having used a set-type status reporting command 428 to enable presentation of the unsolicited result code. The embodiments are not limited in this context.

In various embodiments, TE 104 may use a set-type service configuration command 432 to query MT 106 for information regarding eMBMS services that are available for use by MT 106. In some embodiments, TE 104 may use a set-type service configuration command 432 to query MT 106 for information regarding eMBMS services that are being used by MT 106. In various embodiments, TE 104 may use a set-type service configuration command 432 to configure an eMBMS service for use by MT 106. In some embodiments, TE 104 may use a set-type service configuration command 432 to de-configure an eMBMS service for use by MT 106. In various embodiments, TE 104 may set a parameter within a set-type service configuration command 432 to one value when using the set-type service configuration command 432 to query MT 106 for information regarding eMBMS services that are available for use by MT 106, to a second value when using the set-type service configuration command 432 to query MT 106 for information regarding eMBMS services that are being used by MT 106, to a third value when using the set-type service configuration command 432 to configure an eMBMS service for use by MT 106, and to a fourth value when using the set-type service configuration command 432 to de-configure an eMBMS service for use by MT 106.

In some embodiments, TE 104 may use a set-type service configuration command 432 to specify whether particular types of eMBMS service information are to be reported to TE 104. In various embodiments, TE 104 may set a parameter within the set-type service configuration command 432 to one value when using the set-type service configuration command 432 to enable reporting of particular types of eMBMS service information, and may set the parameter to another value when using the set-type service configuration command 432 to disable reporting of particular types of eMBMS service information. In some embodiments, the set-type service configuration command 432 may control the presentation of an unsolicited service result code via which particular types of eMBMS service information may be reported. In various such embodiments, TE 104 may set a parameter within the set-type service configuration command 432 to one value when using the set-type service configuration command 432 to enable presentation of the unsolicited service result code, and may set the parameter to another value when using the set-type service configuration command 432 to disable presentation of the unsolicited service result code. In some embodiments, TE 104 may use a read-type service configuration command 432 to request information indicating whether reporting of the particular types of eMBMS service information is enabled at MT 106. In various embodiments, the requested information may indicate whether presentation of the unsolicited service result code is enabled at MT 106. In some embodiments, TE 104 may use a test-type service configuration command 432 to request information identifying supported values for one or more parameters of a set-type service configuration command 432. The embodiments are not limited in this context.

In various embodiments, after using a set-type service configuration command 432 to query MT 106 for information regarding eMBMS services that are available for use, or being used, by MT 106 or to enable presentation of the unsolicited service result code, TE 104 may receive a service information message 434 from TA 108. In some embodiments, service information message 434 may comprise information identifying one or more eMBMS services that are available for use by MT 106. In various embodiments, service information message 434 may comprise information identifying one or more eMBMS services that are being used by MT 106. In some embodiments, service information message 434 may comprise information that is reported to TE 104 via an unsolicited service result code, in response to TE 104 having used a set-type service configuration command 432 to enable presentation of the unsolicited service result code. The embodiments are not limited in this context.

In various embodiments, TE 104 may use a set-type enter data state command 436 to cause MT 106 to enter an eMBMS data state. In some embodiments, TE 104 may set a parameter within the set-type enter data state command 436 to a value identifying an eMBMS session, and MT 106 may configure a channel for data transfer for the specified eMBMS session in conjunction with entering the eMBMS data state. In various embodiments, TE 104 may set the parameter to the value of an eMBMS session ID for the eMBMS session. The embodiments are not limited in this context.

In some embodiments, TE 104 may use set-type counting procedure command 438 to provide MT 106 with a list of temporary mobile group identities (TMGIs) for which it is interested in receiving eMBMS services. In various embodiments, TE 104 may send the set-type counting procedure command 438 to TA 108 in response initiation by eNB 214 of an MBMS counting procedure. In some such embodiments, eNB 214 may initiate the MBMS counting procedure by sending an MBMSCountingRequest message to mobile device 102. In various embodiments, mobile device 102 may send an MBMSCountingResponse message in response to the MBMSCountingRequest message. In some embodiments, mobile device 102 may determine the contents of the MBMSCountingResponse message based on the list of TMGIs comprised in the set-type counting procedure command 438. In various embodiments, TE 104 may use a read-type counting procedure command 438 to request information identifying a list of TMGIs that TE 104 previously provided via a set-type counting procedure command 438. The embodiments are not limited in this context.

Figure 5:
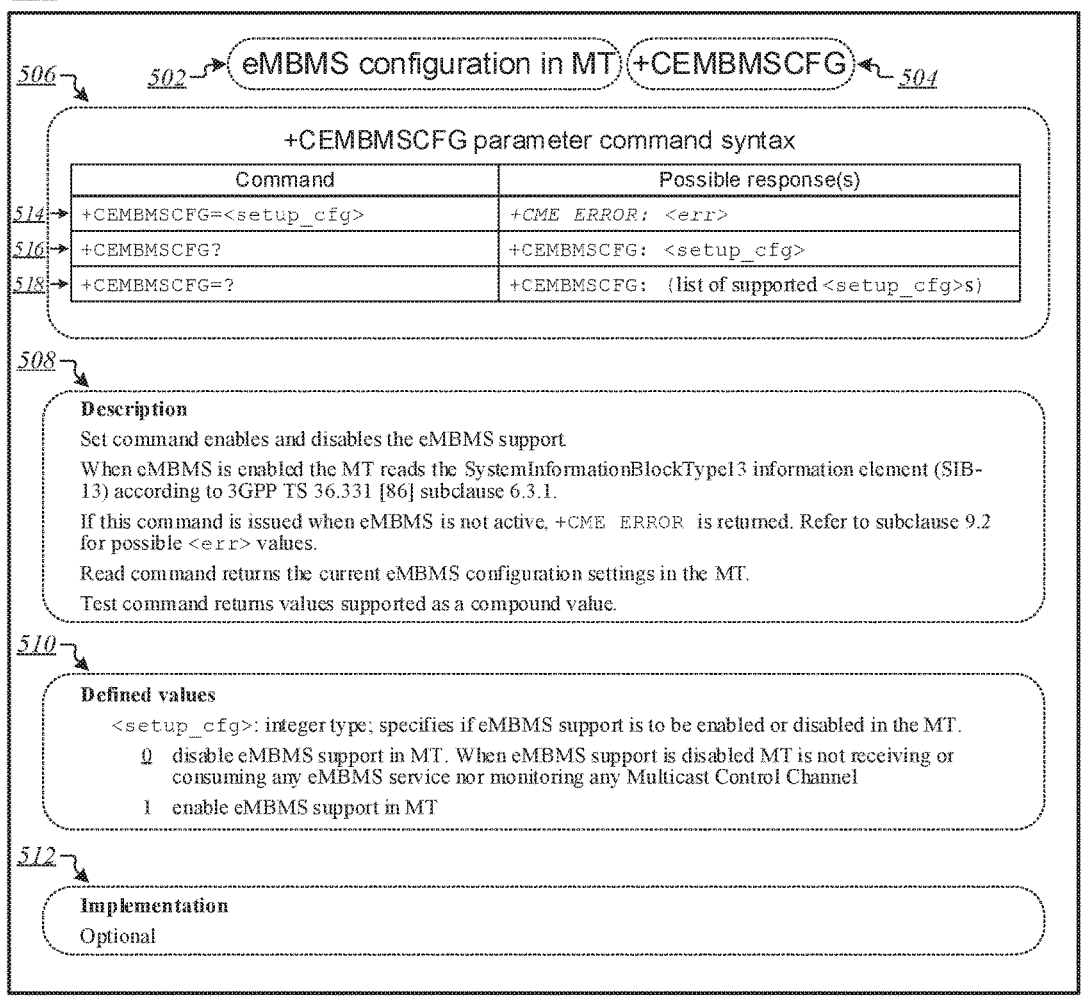
FIG. 5 illustrates an embodiment of a first command definition.

FIG. 5 illustrates an example of an AT command definition 500 that may be representative of a definition of one or more eMBMS-specific AT commands that may be used in some embodiments in conjunction with the implementation of mobile termination control techniques to support eMBMS. For example, AT command definition 500 may be representative of a definition of one or more of configuration commands 426 of FIG. 4 according to various embodiments. More particularly, AT command definition 500 may be representative of a definition of a set-type configuration command 426, a read-type configuration command 426, and a test-type configuration command 426 of FIG. 4. AT command definition 500 may comprise a command name 502, a command parameter 504, a command syntax table 506, a command description section 508, a defined values section 510, and an implementation section 512.

As shown in FIG. 5, the command name 502 associated with AT command definition 500 is "eMBMS configuration in MT". Command parameter 504 may comprise a command line parameter that can be used to construct one or more extended AT commands according to command syntax table 506. In this example, command parameter 504 comprises the value "+CEMBMSCFG". Command syntax table 506 comprises a "Command" column that defines the syntax for a set command 514, a read command 516, and a test command 518, each of which includes the value of command parameter 504. Command syntax table 506 also comprises a "Possible response(s)" column that describes the syntax for possible responses to set command 514, read command 516, and test command 518. Set command 514, which may be representative of a set-type configuration command 426 of FIG. 4, is constructed according to the syntax "+CEMBMSCFG=<setup_cfg>", where <setup_cfg> is a parameter for which possible values are specified in defined values section 510. Read command 516, which may be representative of a read-type configuration command 426 of FIG. 4, is constructed according to the syntax "+CEMBMSCFG?". Test command 518, which may be representative of a test-type configuration command 426 of FIG. 4, is constructed according to the syntax "+CEMBMSCFG=?".

As shown in command description section 508, set command 514 may be used to enable and disable eMBMS support at an MT. When eMBMS is enabled, the MT reads a SystemInformationBlockType13 information element (SIB-13) according to 3GPP TS 36.331 subclause 6.3.1. If set command 514 is issued when eMBMS service is not active, a "+CME ERROR" code is returned. Read command 516 returns the current eMBMS configuration settings in the MT. Test command 518 returns the supported values of the <setup_cfg> parameter, as a compound value. As shown in defined values section 510, those supported values—which are used to specify whether eMBMS support is to be enabled or disabled in the MT—are 0 and 1. The value 0 is used to disable eMBMS support in the MT. When eMBMS support is disabled, the MT is not receiving or consuming any eMBMS service, nor is it monitoring any Multicast Control Channel. The value 1 is used to enable eMBMS support in the MT. As shown in implementation section 512, the commands defined in AT command definition 500 are optional commands. The embodiments are not limited in this context.

Figure 6:
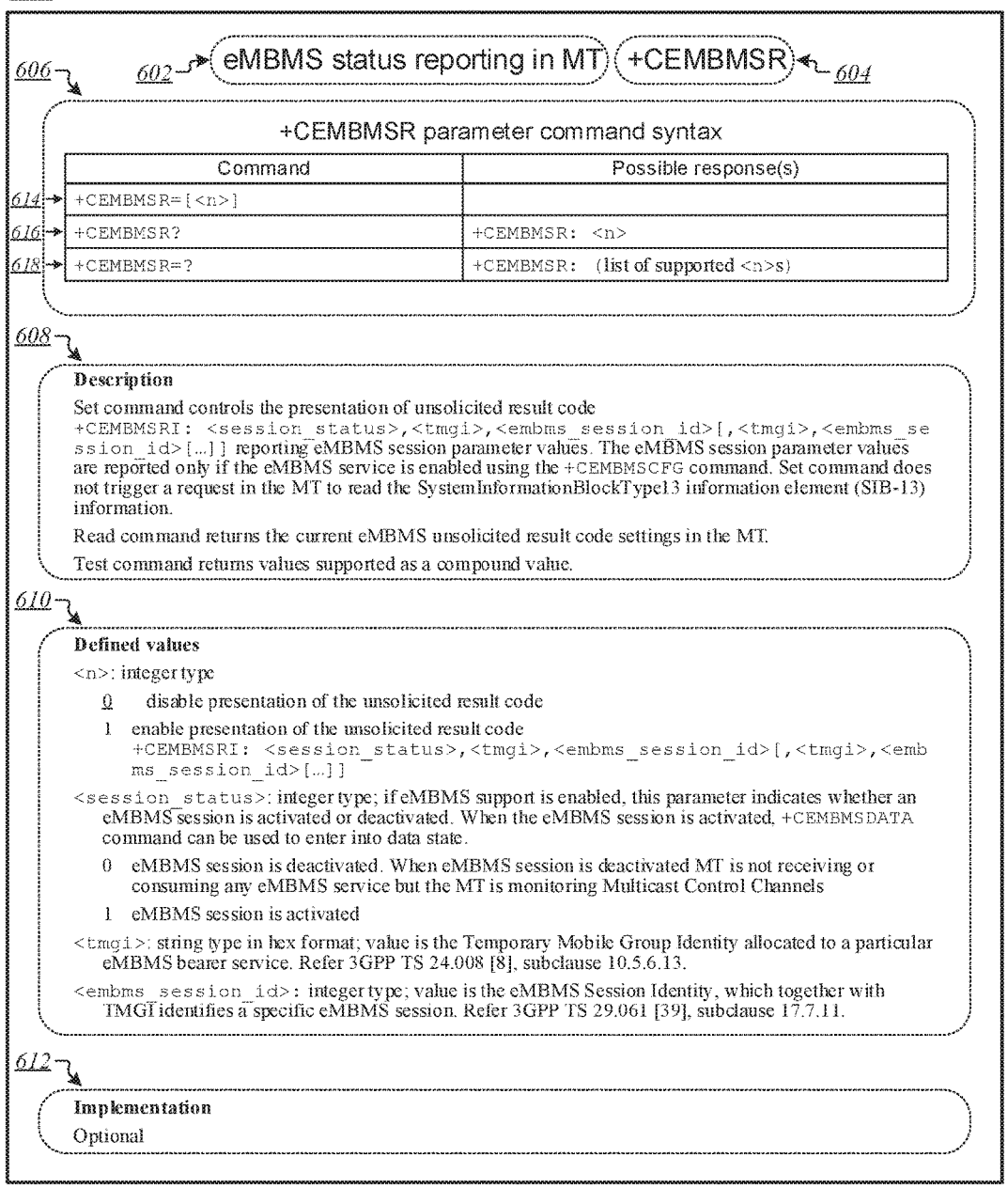
FIG. 6 illustrates an embodiment of a second command definition.

FIG. 6 illustrates an example of an AT command definition 600 that may be representative of a definition of one or more eMBMS-specific AT commands that may be used in some embodiments in conjunction with the implementation of mobile termination control techniques to support eMBMS. For example, AT command definition 600 may be representative of a definition of one or more of status reporting commands 428 of FIG. 4 according to various embodiments. More particularly, AT command definition 600 may be representative of a definition of a set-type status reporting command 428, a read-type status reporting command 428, and a test-type status reporting command 428 of FIG. 4. AT command definition 600 may comprise a command name 602, a command parameter 604, a command syntax table 606, a command description section 608, a defined values section 610, and an implementation section 612.

As shown in FIG. 6, the command name 602 associated with AT command definition 600 is "eMBMS status reporting in MT". Command parameter 604 may comprise a command line parameter that can be used to construct one or more extended AT commands according to command syntax table 606. In this example, command parameter 604 comprises the value "+CEMBMSR". Command syntax table 606 comprises a "Command" column that defines the syntax for a set command 614, a read command 616, and a test command 618, each of which includes the value of command parameter 604. Command syntax table 606 also comprises a "Possible response(s)" column that describes the syntax for possible responses to read command 616 and test command 618. Set command 614, which may be representative of a set-type status reporting command 428 of FIG. 4, is constructed according to the syntax "+CEMBMSR=[<n>]", where <n> is a parameter for which possible values are specified in defined values section 610. Read command 616, which may be representative of a read-type status reporting command 428 of FIG. 4, is constructed according to the syntax "+CEMBMSR?". Test command 618, which may be representative of a test-type status reporting command 428 of FIG. 4, is constructed according to the syntax "+CEMBMSR=?".

As shown in command description section 608, set command 614 may be used to control the presentation of an unsolicited result code "+CEMBMSRI:" for reporting eMBMS session parameter values. Such eMBMS session parameter values are reported only if the eMBMS service is enabled using a "+CEMBMSCFG" command. Set command 614 does not trigger a request in the MT to read the SystemInformationBlockType13 information element (SIB-13) information. Read command 616 returns the current eMBMS unsolicited result code settings in the MT. Test command 618 returns the supported values of the <n> parameter, as a compound value. As shown in defined values section 610, those supported values—which may be used to control presentation of the unsolicited result code "+CEMBMSRI:"—are 0 and 1. The value 0 may be used to disable presentation of the unsolicited result code, while the value 1 may be used to enable presentation of the unsolicited result code. As shown in implementation section 612, the commands defined in AT command definition 600 are optional commands.

Defined values section 610 indicates that the syntax for the unsolicited result code "+CEMBMSRI:" is "+CEMBMSRI: <session_status>, <tmgi>, <embms_session_id>[, <tmgi>, <embms_session_id>[ . . . ]]". If eMBMS support is enabled, <session_status> indicates whether an eMBMS session is activated or deactivated. When the eMBMS session is activated, a "+CEMBMSDATA" command can be used to enter into a data state. A value of 0 for <session_status> indicates that the eMBMS session is deactivated. When the eMBMS session is deactivated, the MT is not receiving or consuming any eMBMS service, but is monitoring Multicast Control Channels. A value of 1 for <session_status> indicates that the eMBMS session is activated. The value of any particular <tmgi> parameter is a Temporary Mobile Group Identity allocated to a particular eMBMS bearer service. The value of any particular <embms_session_id> parameter is an eMBMS Session Identity, which together with the value of a <tmgi> parameter may identify a specific eMBMS session. The embodiments are not limited in this context.

Figure 7A:
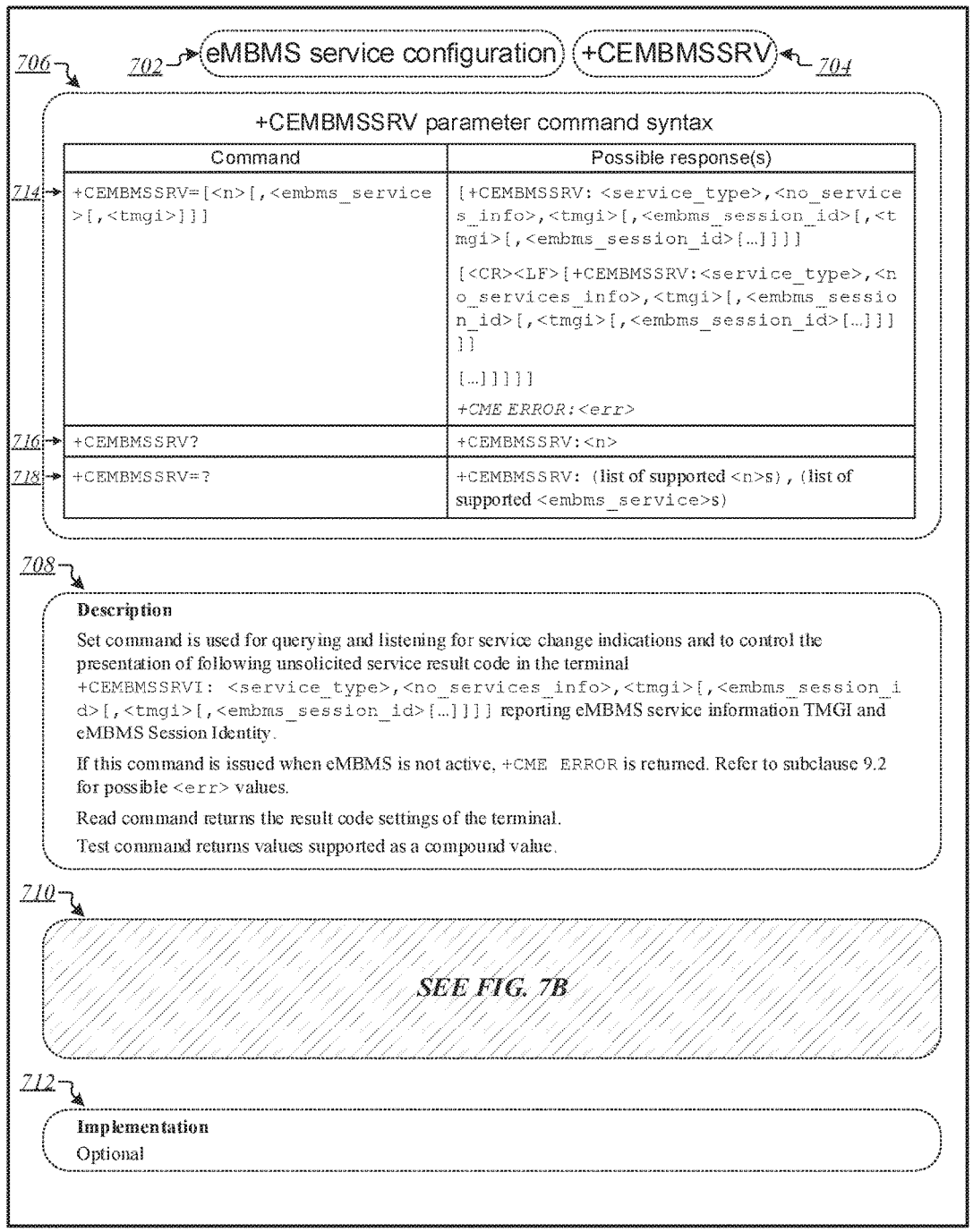
FIG. 7A illustrates an embodiment of a third command definition.

FIG. 7A illustrates an example of an AT command definition 700 that may be representative of a definition of one or more eMBMS-specific AT commands that may be used in some embodiments in conjunction with the implementation of mobile termination control techniques to support eMBMS. For example, AT command definition 700 may be representative of a definition of one or more of service configuration commands 432 of FIG. 4 according to various embodiments. More particularly, AT command definition 700 may be representative of a definition of a set-type service configuration command 432, a read-type service configuration command 432, and a test-type service configuration command 432 of FIG. 4. AT command definition 700 may comprise a command name 702, a command parameter 704, a command syntax table 706, a command description section 708, a defined values section 710, and an implementation section 712.

As shown in FIG. 7, the command name 702 associated with AT command definition 700 is "eMBMS service configuration". Command parameter 704 may comprise a command line parameter that can be used to construct one or more extended AT commands according to command syntax table 706. In this example, command parameter 704 comprises the value "+CEMBMSSRV". Command syntax table 706 comprises a "Command" column that defines the syntax for a set command 714, a read command 716, and a test command 718, each of which includes the value of command parameter 704. Command syntax table 706 also comprises a "Possible response(s)" column that describes the syntax for possible responses to set command 714, read command 716 and test command 718. Set command 714, which may be representative of a set-type service configuration command 432 of FIG. 4, is constructed according to the syntax "+CEMBMSSRV=[<n>[,<embms_service>[, <tmgi>]]]", where <n>, <embms_service>, and <tmgi> are parameters for which possible values are specified in defined values section 710. Read command 716, which may be representative of a read-type service configuration command 432 of FIG. 4, is constructed according to the syntax "+CEMBMSSRV?". Test command 718, which may be representative of a test-type service configuration command 432 of FIG. 4, is constructed according to the syntax "+CEMBMSSRV=?".

As shown in command description section 708, set command 714 may be used to query and listen for service change indications and to control the presentation of an unsolicited result code "+CEMBMSSRVI:" for reporting eMBMS service information, TMGI, and eMBMS Session Identity. Command description section 708 indicates that the syntax for the unsolicited result code "+CEMBMSSRVI:" is "+CEMBMSSRVI: <service_type>, <no_services_info>, <tmgi>[, <embms_session_id>[, <tmgi>[, <embms_session_id>[ . . . ]]]]". If set command 714 is issued when eMBMS is not active, a "+CME ERROR" code is returned. Read command 716 returns the result code settings of the terminal. Test command 718 returns the supported values of the <n> and <embms_service> parameters, as a compound value. As shown in implementation section 712, the commands defined in AT command definition 700 are optional commands.

FIG. 7B illustrates the contents of defined values section 710 of FIG. 7A. As shown in defined values section 710 in FIG. 7B, the supported values of the <n> parameter of FIG.

7A—which may be used to control the presentation of the eMBMS unsolicited result code "+CEMBMSSRVI:"—are 0 and 1. The value 0 may be used to disable the eMBMS unsolicited result code, while the value 1 may be used to enable the eMBMS unsolicited result code. The supported values of the <embms_service> parameter of FIG. 7A—which may be used to query and configure eMBMS services—are 0, 1, 2, 3, and 4. The value 0 may be used to query eMBMS services available for use by the MT. The value 1 may be used to query eMBMS services being used by the MT. The value 2 may be used to configure an eMBMS service for use by the MT. The value 3 may be used to de-configure use of an eMBMS service by the MT. The value 4 may be used to keep a current configuration of eMBMS services used by the MT. The value 4 may comprise a default value for use by the MT.

Defined values section 710 also describes the <service_type>, <no_services_info>, <tmgi>, and <embms_session_id> parameters of the unsolicited result code "+CEMBMSSRVI:" for which the syntax is provided in command description section 708 of FIG. 7A. As shown in defined values section 710, the supported values of the <service_type> parameter—which indicates whether the eMBMS service is available for use or is being used by the MT—are 0 and 1. The value 0 indicates that the eMBMS service is available for use by the MT, while the value 1 indicates that the eMBMS service is being used by the MT. The <no_services_info> parameter indicates a number of eMBMS services for which information is reported for a particular <service_type> value. The value of any particular <tmgi> parameter is a Temporary Mobile Group Identity allocated to a particular eMBMS bearer service. The value of any particular <embms_session_id> parameter is an optional eMBMS Session Identity, which together with the value of a <tmgi> parameter may identify a specific eMBMS session. The embodiments are not limited in this context.

Figure 8:
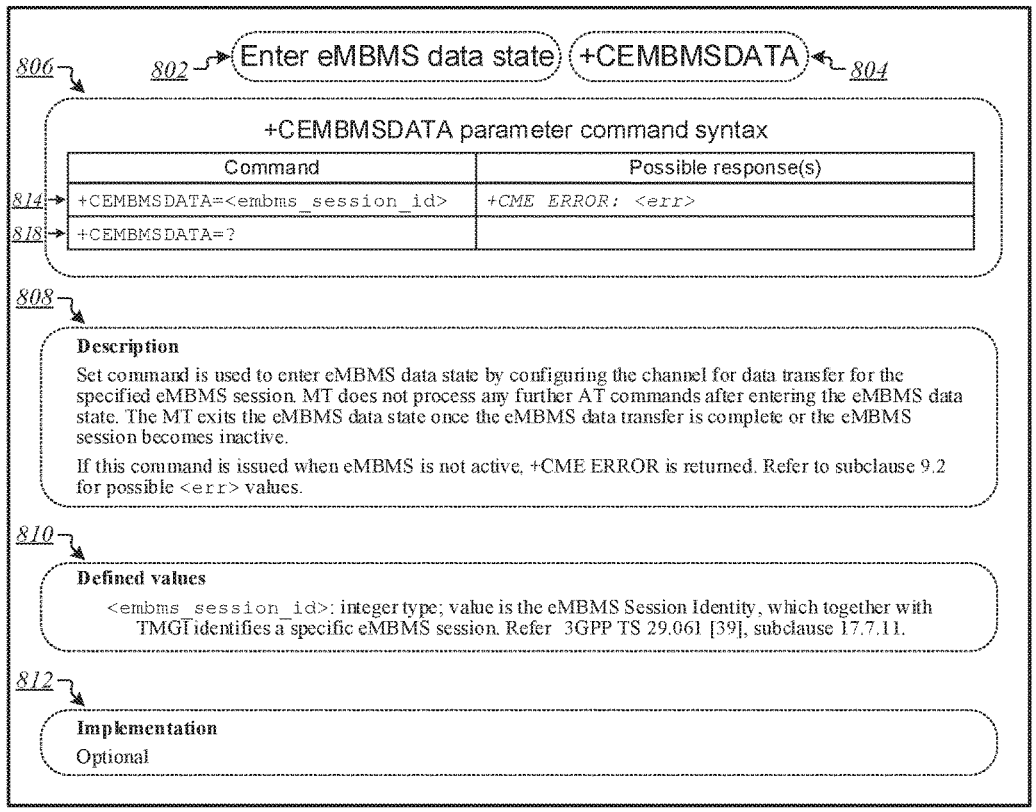
FIG. 8 illustrates an embodiment of a fourth command definition.

FIG. 8 illustrates an example of an AT command definition 800 that may be representative of a definition of one or more eMBMS-specific AT commands that may be used in some embodiments in conjunction with the implementation of mobile termination control techniques to support eMBMS. For example, AT command definition 800 may be representative of a definition of one or more of enter data state commands 436 of FIG. 4 according to various embodiments. More particularly, AT command definition 800 may be representative of a definition of a set-type enter data state command 436 and a test-type enter data state command 436 of FIG. 4. AT command definition 800 may comprise a command name 802, a command parameter 804, a command syntax table 806, a command description section 808, a defined values section 810, and an implementation section 812.

As shown in FIG. 8, the command name 802 associated with AT command definition 800 is "Enter eMBMS data state". Command parameter 804 may comprise a command line parameter that can be used to construct one or more extended AT commands according to command syntax table 806. In this example, command parameter 804 comprises the value "+CEMBMSDATA". Command syntax table 806 comprises a "Command" column that defines the syntax for a set command 814, and a test command 818, both of which include the value of command parameter 804. Command syntax table 806 also comprises a "Possible response(s)" column that describes the syntax for possible responses to set command 814. Set command 814, which may be representative of a set-type enter data state command 436 of FIG. 4, is constructed according to the syntax "+CEMBMSDATA=<embms_session_id>", where <embms_session_id> is a parameter described in defined values section 810. Test command 818, which may be representative of a test-type enter data state command 436 of FIG. 4, is constructed according to the syntax "+CEMBMSDATA=?".

As shown in command description section 808, set command 814 may be used to enter the eMBMS data state by configuring a channel for data transfer for the specified eMBMS session. The MT may not process any further AT commands after entering the eMBMS data state in response to set command 814. The MT may exit the eMBMS data state once the eMBMS data transfer is complete or the eMBMS session becomes inactive. If set command 814 is issued when eMBMS is not active, a "+CME ERROR" code may be returned. Defined values section 810 indicates that the value of the <embms_session_id> parameter comprises an eMBMS Session Identity, which together with a TMGI, may identify a specific eMBMS session. As shown in implementation section 812, the commands defined in AT command definition 800 are optional commands. The embodiments are not limited in this context.

Figure 9:
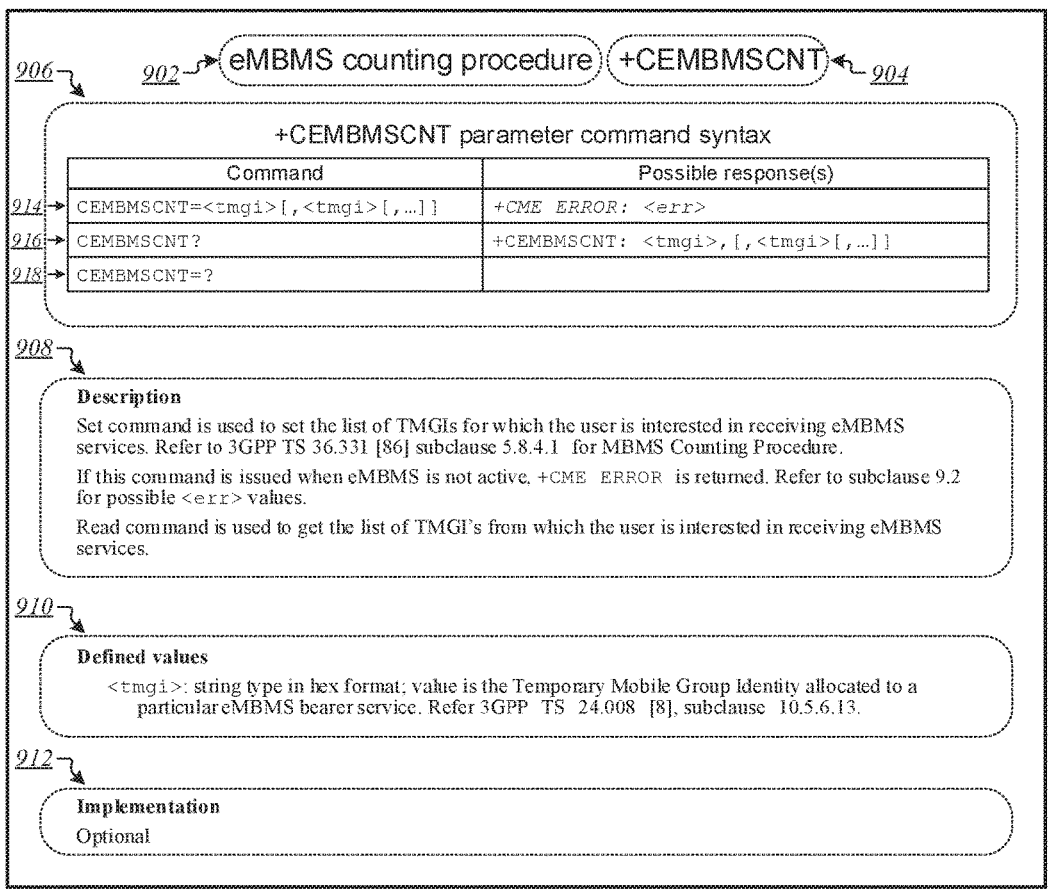
FIG. 9 illustrates an embodiment of a fifth command definition.

FIG. 9 illustrates an example of an AT command definition 900 that may be representative of a definition of one or more eMBMS-specific AT commands that may be used in some embodiments in conjunction with the implementation of mobile termination control techniques to support eMBMS. For example, AT command definition 900 may be representative of a definition of one or more of counting procedure commands 438 of FIG. 4 according to various embodiments. More particularly, AT command definition 900 may be representative of a definition of a set-type counting procedure command 438, a read-type counting procedure command 438, and a test-type counting procedure command 438 of FIG. 4. AT command definition 900 may comprise a command name 902, a command parameter 904, a command syntax table 906, a command description section 908, a defined values section 910, and an implementation section 912.

As shown in FIG. 9, the command name 902 associated with AT command definition 900 is "eMBMS counting procedure". Command parameter 904 may comprise a command line parameter that can be used to construct one or more extended AT commands according to command syntax table 906. In this example, command parameter 904 comprises the value "+CEMBMSCNT". Command syntax table 906 comprises a "Command" column that defines the syntax for a set command 914, a read command 916, and a test command 918, each of which includes the value of command parameter 904. Command syntax table 906 also comprises a "Possible response(s)" column that describes the syntax for possible responses to set command 914, read command 916, and test command 918. Set command 914, which may be representative of a set-type counting procedure command 438 of FIG. 4, is constructed according to the syntax "CEMBMSCNT=<tmgi>[, <tmgi>[, . . . ]]", where <tmgi> is a parameter described in defined values section 910. Read command 916, which may be representative of a read-type counting procedure command 438 of FIG. 4, is constructed according to the syntax "+CEMBMSCNT?". Test command 918, which may be representative of a test-type counting procedure command 438 of FIG. 4, is constructed according to the syntax "+CEMBMSCNT=?".

As shown in command description section 908, set command 914 may be used to set the list of TMGIs for which a user is interested in receiving eMBMS services. If set command 914 is issued when eMBMS is not active, a "+CME ERROR" code may be returned Read command 916 may be used to get the list of TMGIs from which the user is interested in receiving eMBMS services. As shown in defined values section 910, the value of any particular <tmgi> parameter is a Temporary Mobile Group Identity allocated to a particular eMBMS bearer service. As shown in implementation section 912, the commands defined in AT command definition 900 are optional commands. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 10:
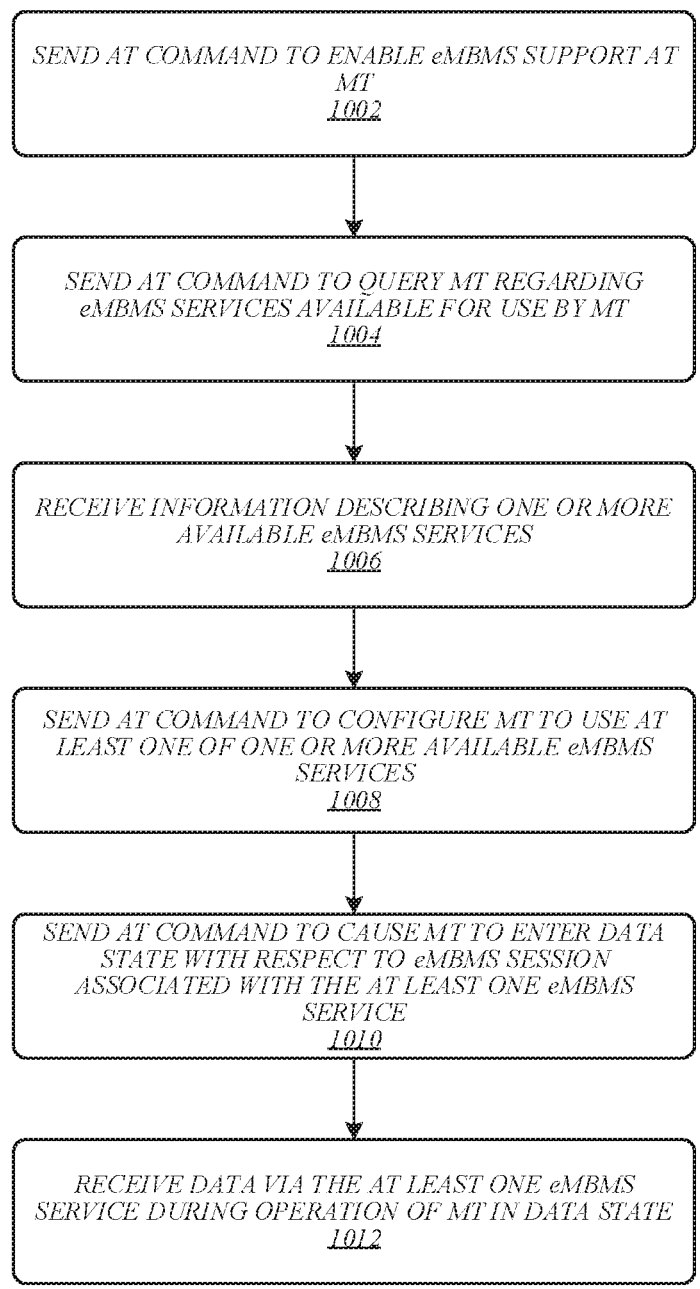
FIG. 10 illustrates an embodiment of a logic flow.

FIG. 10 illustrates an example of a logic flow 1000 that may be representative of the implementation of mobile termination control techniques to support eMBMS in some embodiments. For example, logic flow 1000 may be representative of operations that may be performed by TE 104 in operating environment 400 of FIG. 4 according to various embodiments. As shown in FIG. 10, an AT command may be sent at 1002 to enable eMBMS support at an MT. For example, TE 104 of FIG. 4 may send a set-type configuration command 426 to enable eMBMS support at MT 106. At 1004, an AT command may be sent to query the MT regarding eMBMS services available for use by the MT. For example TE 104 of FIG. 4 may send a set-type service configuration command 432 to query MT 106 regarding eMBMS services 212 available for use by MT 106.

At 1006, information may be received that describes one or more available eMBMS services. For example, TE 104 of FIG. 4 may receive a service information message 434 comprising information describing one or more available eMBMS services 212. At 1008, an AT command may be sent to configure the MT to use at least one of the one or more available eMBMS services. For example, TE 104 of FIG. 4 may send a set-type service configuration command 432 to configure MT 106 to use at least one of one or more available eMBMS services 212. At 1010, an AT command may be sent to cause the MT to enter the data state with respect to an eMBMS session associated with the at least one eMBMS service. For example, TE 104 of FIG. 4 may send a set-type enter data state command 436 to cause MT 106 to enter the data state with respect to an eMBMS session associated with at least one available service that it was configured to use at 1008. At 1012, data may be received via the at least one eMBMS service during operation of the MT in the data state. For example, TE 104 of FIG. 4 may receive data via at least one available eMBMS service that it configured MT 106 to use at 1008. The embodiments are not limited to these examples.

Figure 11:
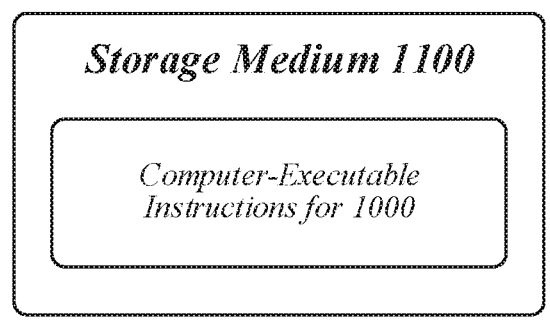
FIG. 11 illustrates an embodiment of a storage medium.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
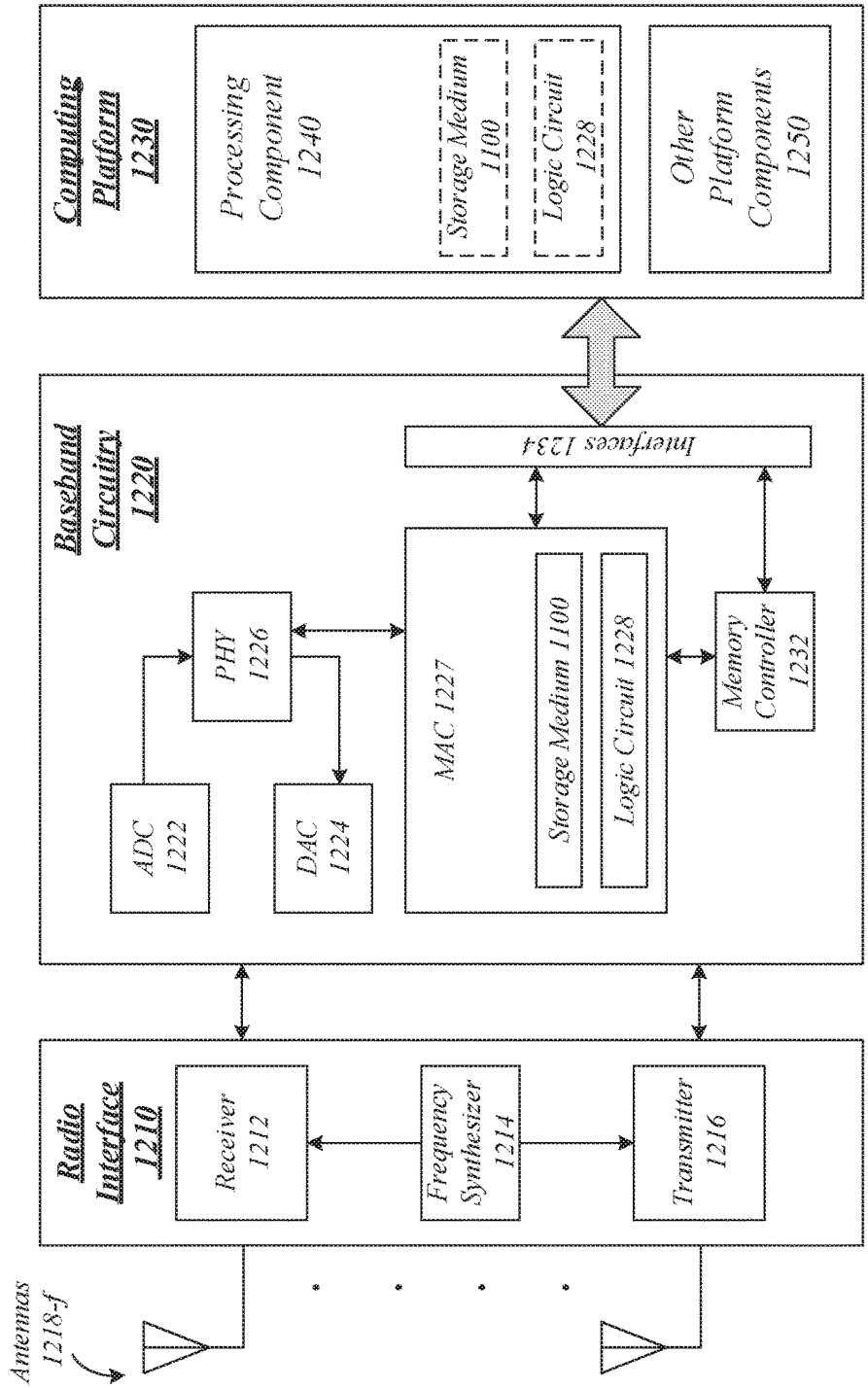
FIG. 12 illustrates an embodiment a device.

FIG. 12 illustrates an embodiment of a communications device 1200 that may implement one or more of mobile device 102 of FIG. 4, logic flow 1000 of FIG. 10, and storage medium 1100 of FIG. 11. In various embodiments, device 1200 may comprise a logic circuit 1228. The logic circuit 1228 may include physical circuits to perform operations described for one or more of mobile device 102 of FIG. 4 and logic flow 1000 of FIG. 10, for example. As shown in FIG. 12, device 1200 may include a radio interface 1210, baseband circuitry 1220, and computing platform 1230, although the embodiments are not limited to this configuration.

The device 1200 may implement some or all of the structure and/or operations for one or more of mobile device 102 of FIG. 4, logic flow 1000 of FIG. 10, storage medium 1100 of FIG. 11, and logic circuit 1228 in a single computing entity, such as entirely within a single device. Alternatively, the device 1200 may distribute portions of the structure and/or operations for one or more of mobile device 102 of FIG. 4, logic flow 1000 of FIG. 10, storage medium 1100 of FIG. 11, and logic circuit 1228 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-$f$. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for one or more of mobile device 102 of FIG. 4, logic flow 1000 of FIG. 10, storage medium 1100 of FIG. 11, and logic circuit 1228 using the processing component 1240. The processing component 1240 (and/or PHY 1226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
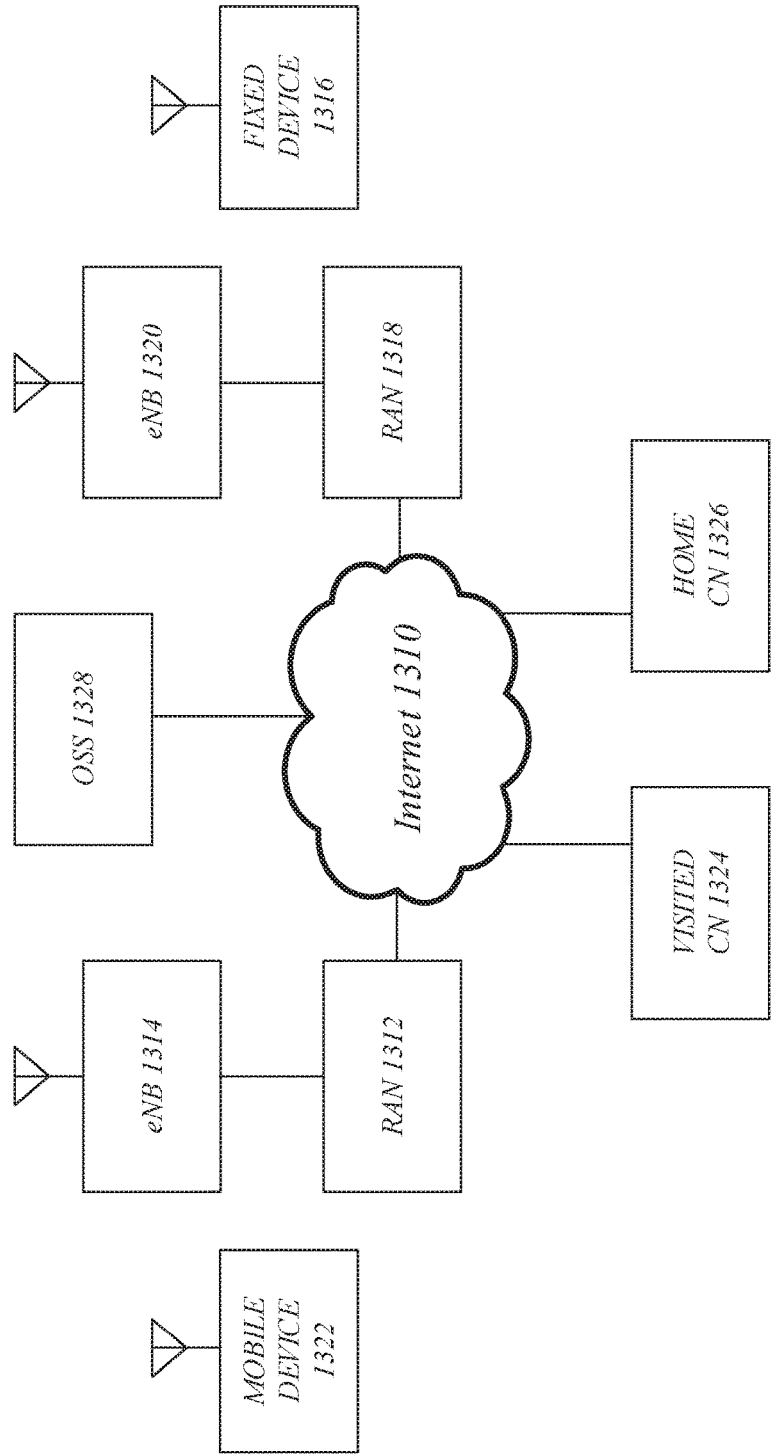
FIG. 13 illustrates an embodiment of a wireless network.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1300, radio access networks (RANs) 1312 and 1318 are capable of coupling with evolved node Bs (eNBs) 1314 and 1320, respectively, to provide wireless communication between one or more fixed devices 1316 and internet 1310 and/or between or one or more mobile devices 1322 and Internet 1310. One example of a fixed device 1316 and a mobile device 1322 is device 1200 of FIG. 12, with the fixed device 1316 comprising a stationary version of device 1200 and the mobile device 1322 comprising a mobile version of device 1200. RANs 1312 and 1318 may implement profiles that are capable of defining the mapping of network functions to one or more physical entities on broadband wireless access system 1300. eNBs 1314 and 1320 may comprise radio equipment to provide RF communication with fixed device 1316 and/or mobile device 1322, such as described with reference to device 1200, and may comprise, for example, the PHY and MAC layer equipment in compliance with a 3GPP LTE Specification or an IEEE 802.16 Standard. eNBs 1314 and 1320 may further comprise an IP backplane to couple to Internet 1310 via RANs 1312 and 1318, respectively, although the scope of the claimed subject matter is not limited in these respects.

Broadband wireless access system 1300 may further comprise a visited core network (CN) 1324 and/or a home CN 1326, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1324 and/or home CN 1326, and the scope of the claimed subject matter is not limited in these respects. Visited CN 1324 may be referred to as a visited CN in the case where visited CN 1324 is not part of the regular service provider of fixed device 1316 or mobile device 1322, for example where fixed device 1316 or mobile device 1322 is roaming away from its respective home CN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322. The embodiments are not limited in this context.

Fixed device 1316 may be located anywhere within range of one or both of eNBs 1314 and 1320, such as in or near a home or business to provide home or business customer broadband access to Internet 1310 via eNBs 1314 and 1320 and RANs 1312 and 1318, respectively, and home CN 1326. It is worthy of note that although fixed device 1316 is generally disposed in a stationary location, it may be moved to different locations as needed. Mobile device 1322 may be utilized at one or more locations if mobile device 1322 is within range of one or both of eNBs 1314 and 1320, for example. In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus, comprising logic, at least a portion of which is in hardware, the logic to send a first AT command to enable evolved Multimedia Broadcast Multicast Service (eMBMS) support at a mobile termination (MT), send a second AT command to query the MT regarding eMBMS services available for use by the MT, receive information describing one or more available eMBMS services in response to the second AT command, and send a third AT command to configure the MT to use at least one of the one or more available eMBMS services.

Example 2 is the apparatus of Example 1, the logic to send a fourth AT command to cause the MT to enter a data state with respect to an eMBMS session associated with the at least one eMBMS service and receive data via the at least one eMBMS service during operation of the MT in the data state.

Example 3 is the apparatus of Example 1, the first AT command to cause the MT to monitor a multicast control channel (MCCH).

Example 4 is the apparatus of Example 3, the logic to send a fifth AT command to disable eMBMS support at the MT, the fifth AT command to cause the MT to refrain from monitoring the MCCH.

Example 5 is the apparatus of Example 1, the logic to send a sixth AT command to enable presentation of an unsolicited result code for reporting eMBMS session parameter values.

Example 6 is the apparatus of Example 1, the logic to send a seventh AT command to query the MT regarding eMBMS services used by the MT.

Example 7 is the apparatus of Example 6, the logic to receive information describing one or more used eMBMS services in response to the seventh AT command and send an eighth AT command to de-configure use of at least one of the one or more used eMBMS services by the MT.

Example 8 is the apparatus of Example 1, the logic to send a ninth AT command to provide the MT with a list of temporary mobile group identities (TMGIs) associated with eMBMS services of interest.

Example 9 is user equipment (UE), comprising an apparatus according to any of Examples 1 to 8, at least one radio frequency (RF) transceiver, and at least one RF antenna.

Example 10 is at least one non-transitory computer-readable storage medium comprising a set of instructions that, in response to being executed on a computing device, cause the computing device to send a first evolved Multimedia Broadcast Multicast Service (eMBMS)-specific AT command to query a mobile termination (MT) regarding eMBMS services available for use by the MT, receive information describing one or more available eMBMS services in response to the first eMBMS-specific AT command, send a second eMBMS-specific AT command to configure the MT to use at least one of the one or more available eMBMS services, send a third eMBMS-specific AT command to cause the MT to enter a data state with respect to an eMBMS session associated with the at least one eMBMS service, and receive data of the at least one eMBMS service via the eMBMS session.

Example 11 is the at least one non-transitory computer-readable storage medium of Example 10, comprising instructions that, in response to being executed on the computing device, cause the computing device to send a fourth eMBMS-specific AT command to enable presentation of an unsolicited result code for reporting eMBMS session parameter values.

Example 12 is the at least one non-transitory computer-readable storage medium of Example 10, comprising instructions that, in response to being executed on the computing device, cause the computing device to send a fifth eMBMS-specific AT command to query the MT regarding eMBMS services used by the MT.

Example 13 is the at least one non-transitory computer-readable storage medium of Example 12, comprising instructions that, in response to being executed on the computing device, cause the computing device to receive information describing one or more used eMBMS services in response to the fifth eMBMS-specific AT command, and send an sixth eMBMS-specific AT command to de-configure use of at least one of the one or more used eMBMS services by the MT.

Example 14 is the at least one non-transitory computer-readable storage medium of Example 10, comprising instructions that, in response to being executed on the computing device, cause the computing device to send a seventh eMBMS-specific AT command to provide the MT with a list of temporary mobile group identities (TMGIs) associated with eMBMS services of interest.

Example 15 is the at least one non-transitory computer-readable storage medium of Example 10, comprising instructions that, in response to being executed on the computing device, cause the computing device to send an eighth eMBMS-specific AT command to disable eMBMS support at the MT.

Example 16 is the at least one non-transitory computer-readable storage medium of Example 15, the eighth eMBMS-specific AT command to cause the MT to refrain from monitoring a multicast control channel (MCCH).

Example 17 is the at least one non-transitory computer-readable storage medium of Example 16, comprising instructions that, in response to being executed on the computing device, cause the computing device to send a ninth eMBMS-specific AT command to enable eMBMS support at the MT, the ninth eMBMS-specific AT command to cause the MT to monitor the MCCH.

Example 18 is user equipment (UE), comprising a mobile termination (MT), and terminal equipment (TE) comprising logic, at least a portion of which is in hardware, the logic to send a first AT command to enable evolved Multimedia Broadcast Multicast Service (eMBMS) support at the MT, identify one or more eMBMS services available for use by the MT, send a second AT command to configure the MT to use at least one of the one or more available eMBMS services, and receive data of the at least one eMBMS service via the eMBMS session during operation of the MT in a data state.

Example 19 is the UE of Example 18, the logic to send a third AT command to cause the MT to enter the data state.

Example 20 is the UE of Example 18, the first AT command to cause the MT to monitor a multicast control channel (MCCH).

Example 21 is the UE of Example 20, the logic to send a fourth AT command to disable eMBMS support at the MT, the fourth AT command to cause the MT to refrain from monitoring the MCCH.

Example 22 is the UE of Example 18, the logic to send a fifth AT command to enable presentation of an unsolicited result code for reporting eMBMS session parameter values.

Example 23 is the UE of Example 18, the logic to send a sixth AT command to query the MT regarding services available for use by the MT and identify the one or more available eMBMS services based on information received in response to the sixth AT command.

Example 24 is the UE of Example 18, the logic to send a seventh AT command to query the MT regarding eMBMS services used by the MT.

Example 25 is the UE of Example 24, the logic to receive information describing one or more used eMBMS services in response to the seventh AT command and send an eighth AT command to de-configure use of at least one of the one or more used eMBMS services by the MT.

Example 26 is the UE of any of Examples 18 to 25, comprising at least one radio frequency (RF) transceiver, and at least one RF antenna.

Example 27 is a method, comprising sending, from terminal equipment (TE), a first evolved Multimedia Broadcast Multicast Service (eMBMS)-specific AT command to query a mobile termination (MT) regarding eMBMS services available for use by the MT, receiving information describing one or more available eMBMS services in response to the first eMBMS-specific AT command, sending a second eMBMS-specific AT command to configure the MT to use at least one of the one or more available eMBMS services, sending a third eMBMS-specific AT command to cause the MT to enter a data state with respect to an eMBMS session associated with the at least one eMBMS service, and receiving data of the at least one eMBMS service via the eMBMS session.

Example 28 is the method of Example 27, comprising sending a fourth eMBMS-specific AT command to enable presentation of an unsolicited result code for reporting eMBMS session parameter values.

Example 29 is the method of Example 27, comprising sending a fifth eMBMS-specific AT command to query the MT regarding eMBMS services used by the MT.

Example 30 is the method of Example 29, comprising receiving information describing one or more used eMBMS services in response to the fifth eMBMS-specific AT command, and sending an sixth eMBMS-specific AT command to de-configure use of at least one of the one or more used eMBMS services by the MT.

Example 31 is the method of Example 27, comprising sending a seventh eMBMS-specific AT command to provide the MT with a list of temporary mobile group identities (TMGIs) associated with eMBMS services of interest.

Example 32 is the method of Example 27, comprising sending an eighth eMBMS-specific AT command to disable eMBMS support at the MT.

Example 33 is the method of Example 32, the eighth eMBMS-specific AT command to cause the MT to refrain from monitoring a multicast control channel (MCCH).

Example 34 is the method of Example 33, comprising sending a ninth eMBMS-specific AT command to enable eMBMS support at the MT, the ninth eMBMS-specific AT command to cause the MT to monitor the MCCH.

Example 35 is at least one non-transitory computer-readable storage medium comprising a set of instructions that, in response to being executed on a computing device, cause the computing device to perform a method according to any of Examples 27 to 34.

Example 36 is an apparatus, comprising means for performing a method according to any of Examples 27 to 34.

Example 37 is a system, comprising the apparatus of Example 36, at least one radio frequency (RF) transceiver, and at least one RF antenna.

Example 38 is at least one non-transitory computer-readable storage medium comprising a set of instructions that, in response to being executed on a computing device, cause the computing device to send a first AT command to enable evolved Multimedia Broadcast Multicast Service (eMBMS) support at a mobile termination (MT), identify one or more eMBMS services available for use by the MT, send a second AT command to configure the MT to use at least one of the one or more available eMBMS services, and receive data of the at least one eMBMS service via the eMBMS session during operation of the MT in a data state.

Example 39 is the at least one non-transitory computer-readable storage medium of Example 38, comprising instructions that, in response to being executed on the computing device, cause the computing device to send a third AT command to cause the MT to enter the data state.

Example 40 is the at least one non-transitory computer-readable storage medium of Example 38, the first AT command to cause the MT to monitor a multicast control channel (MCCH).

Example 41 is the at least one non-transitory computer-readable storage medium of Example 40, comprising instructions that, in response to being executed on the computing device, cause the computing device to send a fourth AT command to disable eMBMS support at the MT, the fourth AT command to cause the MT to refrain from monitoring the MCCH.

Example 42 is the at least one non-transitory computer-readable storage medium of Example 38, comprising instructions that, in response to being executed on the computing device, cause the computing device to send a fifth AT command to enable presentation of an unsolicited result code for reporting eMBMS session parameter values.

Example 43 is the at least one non-transitory computer-readable storage medium of Example 38, comprising instructions that, in response to being executed on the computing device, cause the computing device to send a sixth AT command to query the MT regarding services available for use by the MT, and identify the one or more available eMBMS services based on information received in response to the sixth AT command.

Example 44 is the at least one non-transitory computer-readable storage medium of Example 38, comprising instructions that, in response to being executed on the computing device, cause the computing device to send a seventh AT command to query the MT regarding eMBMS services used by the MT.

Example 45 is the at least one non-transitory computer-readable storage medium of Example 44, comprising instructions that, in response to being executed on the computing device, cause the computing device to receive information describing one or more used eMBMS services in response to the seventh AT command, and send an eighth AT command to de-configure use of at least one of the one or more used eMBMS services by the MT.

Example 46 is user equipment (UE), comprising a mobile termination (MT), and terminal equipment (TE) comprising logic, at least a portion of which is in hardware, the logic to send a first AT command to enable evolved Multimedia Broadcast Multicast Service (eMBMS) support at the MT, send a second AT command to query the MT regarding eMBMS services available for use by the MT, receive information describing one or more available eMBMS services in response to the second AT command, and send a third AT command to configure the MT to use at least one of the one or more available eMBMS services.

Example 47 is the UE of Example 46, the logic to send a fourth AT command to cause the MT to enter a data state with respect to an eMBMS session associated with the at least one eMBMS service and receive data via the at least one eMBMS service during operation of the MT in the data state.

Example 48 is the UE of Example 46, the first AT command to cause the MT to monitor a multicast control channel (MCCH).

Example 49 is the UE of Example 48, the logic to send a fifth AT command to disable eMBMS support at the MT, the fifth AT command to cause the MT to refrain from monitoring the MCCH.

Example 50 is the UE of Example 46, the logic to send a sixth AT command to enable presentation of an unsolicited result code for reporting eMBMS session parameter values.

Example 51 is the UE of Example 46, the logic to send a seventh AT command to query the MT regarding eMBMS services used by the MT.

Example 52 is the UE of Example 51, the logic to receive information describing one or more used eMBMS services in response to the seventh AT command and send an eighth AT command to de-configure use of at least one of the one or more used eMBMS services by the MT.

Example 53 is the UE of Example 46, the logic to send a ninth AT command to provide the MT with a list of temporary mobile group identities (TMGIs) associated with eMBMS services of interest.

Example 54 is the UE of any of Examples 46 to 53, comprising at least one radio frequency (RF) transceiver, and at least one RF antenna.

Example 55 is a method, comprising sending, from terminal equipment (TE), a first AT command to enable evolved Multimedia Broadcast Multicast Service (eMBMS) support at a mobile termination (MT), identifying one or more eMBMS services available for use by the MT, sending a second AT command to configure the MT to use at least one of the one or more available eMBMS services, and receiving data of the at least one eMBMS service via the eMBMS session during operation of the MT in a data state.

Example 56 is the method of Example 55, comprising sending a third AT command to cause the MT to enter the data state.

Example 57 is the method of Example 55, the first AT command to cause the MT to monitor a multicast control channel (MCCH).

Example 58 is the method of Example 57, comprising sending a fourth AT command to disable eMBMS support at the MT, the fourth AT command to cause the MT to refrain from monitoring the MCCH.

Example 59 is the method of Example 55, comprising sending a fifth AT command to enable presentation of an unsolicited result code for reporting eMBMS session parameter values.

Example 60 is the method of Example 55, comprising sending a sixth AT command to query the MT regarding services available for use by the MT, and identifying the one or more available eMBMS services based on information received in response to the sixth AT command.

Example 61 is the method of Example 55, comprising sending a seventh AT command to query the MT regarding eMBMS services used by the MT.

Example 62 is the method of Example 61, comprising receiving information describing one or more used eMBMS services in response to the seventh AT command, and sending an eighth AT command to de-configure use of at least one of the one or more used eMBMS services by the MT.

Example 63 is at least one non-transitory computer-readable storage medium comprising a set of instructions that, in response to being executed on a computing device, cause the computing device to perform a method according to any of Examples 55 to 62.

Example 64 is an apparatus, comprising means for performing a method according to any of Examples 55 to 62.

Example 65 is a system, comprising the apparatus of Example 64, at least one radio frequency (RF) transceiver, and at least one RF antenna.

Example 66 is an apparatus, comprising means for sending a first AT command to enable evolved Multimedia Broadcast Multicast Service (eMBMS) support at a mobile termination (MT), means for sending a second AT command to query the MT regarding eMBMS services available for use by the MT, means for receiving information describing one or more available eMBMS services in response to the second AT command, and means for sending a third AT command to configure the MT to use at least one of the one or more available eMBMS services.

Example 67 is the apparatus of Example 66, comprising means for sending a fourth AT command to cause the MT to enter a data state with respect to an eMBMS session associated with the at least one eMBMS service, and means for receiving data via the at least one eMBMS service during operation of the MT in the data state.

Example 68 is the apparatus of Example 66, the first AT command to cause the MT to monitor a multicast control channel (MCCH).

Example 69 is the apparatus of Example 68, comprising means for sending a fifth AT command to disable eMBMS support at the MT, the fifth AT command to cause the MT to refrain from monitoring the MCCH.

Example 70 is the apparatus of Example 66, comprising means for sending a sixth AT command to enable presentation of an unsolicited result code for reporting eMBMS session parameter values.

Example 71 is the apparatus of Example 66, comprising means for sending a seventh AT command to query the MT regarding eMBMS services used by the MT.

Example 72 is the apparatus of Example 71, comprising means for receiving information describing one or more used eMBMS services in response to the seventh AT command, and means for sending an eighth AT command to de-configure use of at least one of the one or more used eMBMS services by the MT.

Example 73 is the apparatus of Example 66, comprising means for sending a ninth AT command to provide the MT with a list of temporary mobile group identities (TMGIs) associated with eMBMS services of interest.

Example 74 is user equipment (UE), comprising an apparatus according to any of Examples 66 to 73, at least one radio frequency (RF) transceiver, and at least one RF antenna.

Example 75 is user equipment (UE), comprising a mobile termination (MT), and terminal equipment (TE) comprising logic, at least a portion of which is in hardware, the logic to send a first evolved Multimedia Broadcast Multicast Service (eMBMS)-specific AT command to query the MT regarding eMBMS services available for use by the MT, receive information describing one or more available eMBMS services in response to the first eMBMS-specific AT command, send a second eMBMS-specific AT command to configure the MT to use at least one of the one or more available eMBMS services, send a third eMBMS-specific AT command to cause the MT to enter a data state with respect to an eMBMS session associated with the at least one eMBMS service, and receive data of the at least one eMBMS service via the eMBMS session.

Example 76 is the UE of Example 75, the logic to send a fourth eMBMS-specific AT command to enable presentation of an unsolicited result code for reporting eMBMS session parameter values.

Example 77 is the UE of Example 75, the logic to send a fifth eMBMS-specific AT command to query the MT regarding eMBMS services used by the MT.

Example 78 is the UE of Example 77, the logic to receive information describing one or more used eMBMS services in response to the fifth eMBMS-specific AT command and send an sixth eMBMS-specific AT command to de-configure use of at least one of the one or more used eMBMS services by the MT.

Example 79 is the UE of Example 75, the logic to send a seventh eMBMS-specific AT command to provide the MT with a list of temporary mobile group identities (TMGIs) associated with eMBMS services of interest.

Example 80 is the UE of Example 75, the logic to send an eighth eMBMS-specific AT command to disable eMBMS support at the MT.

Example 81 is the UE of Example 80, the eighth eMBMS-specific AT command to cause the MT to refrain from monitoring a multicast control channel (MCCH).

Example 82 is the UE of Example 81, the logic to send a ninth eMBMS-specific AT command to enable eMBMS support at the MT, the ninth eMBMS-specific AT command to cause the MT to monitor the MCCH.

Example 83 is the UE of any of Examples 75 to 82, comprising at least one radio frequency (RF) transceiver, and at least one RF antenna.

Example 84 is a method, comprising sending, from terminal equipment (TE), a first AT command to enable evolved Multimedia Broadcast Multicast Service (eMBMS) support at a mobile termination (MT), sending a second AT command to query the MT regarding eMBMS services available for use by the MT, receiving information describing one or more available eMBMS services in response to the second AT command, and sending a third AT command to configure the MT to use at least one of the one or more available eMBMS services.

Example 85 is the method of Example 84, comprising sending a fourth AT command to cause the MT to enter a data state with respect to an eMBMS session associated with the at least one eMBMS service, and receiving data via the at least one eMBMS service during operation of the MT in the data state.

Example 86 is the method of Example 84, the first AT command to cause the MT to monitor a multicast control channel (MCCH).

Example 87 is the method of Example 86, comprising sending a fifth AT command to disable eMBMS support at the MT, the fifth AT command to cause the MT to refrain from monitoring the MCCH.

Example 88 is the method of Example 84, comprising sending a sixth AT command to enable presentation of an unsolicited result code for reporting eMBMS session parameter values.

Example 89 is the method of Example 84, comprising sending a seventh AT command to query the MT regarding eMBMS services used by the MT.

Example 90 is the method of Example 89, comprising receiving information describing one or more used eMBMS services in response to the seventh AT command, and sending an eighth AT command to de-configure use of at least one of the one or more used eMBMS services by the MT.

Example 91 is the method of Example 84, comprising sending a ninth AT command to provide the MT with a list of temporary mobile group identities (TMGIs) associated with eMBMS services of interest.

Example 92 is at least one non-transitory computer-readable storage medium comprising a set of instructions that, in response to being executed on a computing device, cause the computing device to perform a method according to any of Examples 84 to 91.

Example 93 is an apparatus, comprising means for performing a method according to any of Examples 84 to 91.

Example 94 is a system, comprising the apparatus of Example 93, at least one radio frequency (RF) transceiver, and at least one RF antenna.

Example 95 is an apparatus, comprising means for sending a first evolved Multimedia Broadcast Multicast Service (eMBMS)-specific AT command to query a mobile termination (MT) regarding eMBMS services available for use by the MT, means for receiving information describing one or more available eMBMS services in response to the first eMBMS-specific AT command, means for sending a second eMBMS-specific AT command to configure the MT to use at least one of the one or more available eMBMS services, means for sending a third eMBMS-specific AT command to cause the MT to enter a data state with respect to an eMBMS session associated with the at least one eMBMS service, and means for receiving data of the at least one eMBMS service via the eMBMS session.

Example 96 is the apparatus of Example 95, comprising means for sending a fourth eMBMS-specific AT command to enable presentation of an unsolicited result code for reporting eMBMS session parameter values.

Example 97 is the apparatus of Example 95, comprising means for sending a fifth eMBMS-specific AT command to query the MT regarding eMBMS services used by the MT.

Example 98 is the apparatus of Example 97, comprising means for receiving information describing one or more used eMBMS services in response to the fifth eMBMS-specific AT command, and means for sending an sixth eMBMS-specific AT command to de-configure use of at least one of the one or more used eMBMS services by the MT.

Example 99 is the apparatus of Example 95, comprising means for sending a seventh eMBMS-specific AT command to provide the MT with a list of temporary mobile group identities (TMGIs) associated with eMBMS services of interest.

Example 100 is the apparatus of Example 95, comprising means for sending an eighth eMBMS-specific AT command to disable eMBMS support at the MT.

Example 101 is the apparatus of Example 100, the eighth eMBMS-specific AT command to cause the MT to refrain from monitoring a multicast control channel (MCCH).

Example 102 is the apparatus of Example 101, comprising means for sending a ninth eMBMS-specific AT command to enable eMBMS support at the MT, the ninth eMBMS-specific AT command to cause the MT to monitor the MCCH.

Example 103 is user equipment (UE), comprising an apparatus according to any of Examples 95 to 102, at least one radio frequency (RF) transceiver, and at least one RF antenna.

Example 104 is an apparatus, comprising logic, at least a portion of which is in hardware, the logic to send a first AT command to enable evolved Multimedia Broadcast Multicast Service (eMBMS) support at a mobile termination (MT), identify one or more eMBMS services available for use by the MT, send a second AT command to configure the MT to use at least one of the one or more available eMBMS services, and receive data of the at least one eMBMS service via the eMBMS session during operation of the MT in a data state.

Example 105 is the apparatus of Example 104, the logic to send a third AT command to cause the MT to enter the data state.

Example 106 is the apparatus of Example 104, the first AT command to cause the MT to monitor a multicast control channel (MCCH).

Example 107 is the apparatus of Example 106, the logic to send a fourth AT command to disable eMBMS support at the MT, the fourth AT command to cause the MT to refrain from monitoring the MCCH.

Example 108 is the apparatus of Example 104, the logic to send a fifth AT command to enable presentation of an unsolicited result code for reporting eMBMS session parameter values.

Example 109 is the apparatus of Example 104, the logic to send a sixth AT command to query the MT regarding services available for use by the MT and identify the one or more available eMBMS services based on information received in response to the sixth AT command.

Example 110 is the apparatus of Example 104, the logic to send a seventh AT command to query the MT regarding eMBMS services used by the MT.

Example 111 is the apparatus of Example 110, the logic to receive information describing one or more used eMBMS services in response to the seventh AT command and send an eighth AT command to de-configure use of at least one of the one or more used eMBMS services by the MT.

Example 112 is user equipment (UE), comprising an apparatus according to any of Examples 104 to 111, at least one radio frequency (RF) transceiver, and at least one RF antenna.

Example 113 is an apparatus, comprising logic, at least a portion of which is in hardware, the logic to send a first evolved Multimedia Broadcast Multicast Service (eMBMS)-specific AT command to query a mobile termination (MT) regarding eMBMS services available for use by the MT, receive information describing one or more available eMBMS services in response to the first eMBMS-specific AT command, send a second eMBMS-specific AT command to configure the MT to use at least one of the one or more available eMBMS services, send a third eMBMS-specific AT command to cause the MT to enter a data state with respect to an eMBMS session associated with the at least one eMBMS service, and receive data of the at least one eMBMS service via the eMBMS session.

Example 114 is the apparatus of Example 113, the logic to send a fourth eMBMS-specific AT command to enable presentation of an unsolicited result code for reporting eMBMS session parameter values.

Example 115 is the apparatus of Example 113, the logic to send a fifth eMBMS-specific AT command to query the MT regarding eMBMS services used by the MT.

Example 116 is the apparatus of Example 115, the logic to receive information describing one or more used eMBMS services in response to the fifth eMBMS-specific AT command and send an sixth eMBMS-specific AT command to de-configure use of at least one of the one or more used eMBMS services by the MT.

Example 117 is the apparatus of Example 113, the logic to send a seventh eMBMS-specific AT command to provide the MT with a list of temporary mobile group identities (TMGIs) associated with eMBMS services of interest.

Example 118 is the apparatus of Example 113, the logic to send an eighth eMBMS-specific AT command to disable eMBMS support at the MT.

Example 119 is the apparatus of Example 118, the eighth eMBMS-specific AT command to cause the MT to refrain from monitoring a multicast control channel (MCCH).

Example 120 is the apparatus of Example 119, the logic to send a ninth eMBMS-specific AT command to enable eMBMS support at the MT, the ninth eMBMS-specific AT command to cause the MT to monitor the MCCH.

Example 121 is user equipment (UE), comprising an apparatus according to any of Examples 113 to 120, at least one radio frequency (RF) transceiver, and at least one RF antenna.

Example 122 is an apparatus, comprising means for sending a first AT command to enable evolved Multimedia Broadcast Multicast Service (eMBMS) support at a mobile termination (MT), means for identifying one or more eMBMS services available for use by the MT, means for sending a second AT command to configure the MT to use at least one of the one or more available eMBMS services, and means for receiving data of the at least one eMBMS service via the eMBMS session during operation of the MT in a data state.

Example 123 is the apparatus of Example 122, comprising means for sending a third AT command to cause the MT to enter the data state.

Example 124 is the apparatus of Example 122, the first AT command to cause the MT to monitor a multicast control channel (MCCH).

Example 125 is the apparatus of Example 124, comprising means for sending a fourth AT command to disable eMBMS support at the MT, the fourth AT command to cause the MT to refrain from monitoring the MCCH.

Example 126 is the apparatus of Example 122, comprising means for sending a fifth AT command to enable presentation of an unsolicited result code for reporting eMBMS session parameter values.

Example 127 is the apparatus of Example 122, comprising means for sending a sixth AT command to query the MT regarding services available for use by the MT, and means for identifying the one or more available eMBMS services based on information received in response to the sixth AT command.

Example 128 is the apparatus of Example 122, comprising means for sending a seventh AT command to query the MT regarding eMBMS services used by the MT.

Example 129 is the apparatus of Example 128, comprising means for receiving information describing one or more used eMBMS services in response to the seventh AT command, and means for sending an eighth AT command to de-configure use of at least one of the one or more used eMBMS services by the MT.

Example 130 is user equipment (UE), comprising an apparatus according to any of Examples 122 to 129, at least one radio frequency (RF) transceiver, and at least one RF antenna.

Example 131 is at least one non-transitory computer-readable storage medium comprising a set of instructions that, in response to being executed on a computing device, cause the computing device to send a first AT command to enable evolved Multimedia Broadcast Multicast Service (eMBMS) support at a mobile termination (MT), send a second AT command to query the MT regarding eMBMS services available for use by the MT, receive information describing one or more available eMBMS services in response to the second AT command, and send a third AT command to configure the MT to use at least one of the one or more available eMBMS services.

Example 132 is the at least one non-transitory computer-readable storage medium of Example 131, comprising instructions that, in response to being executed on the computing device, cause the computing device to send a fourth AT command to cause the MT to enter a data state with respect to an eMBMS session associated with the at least one eMBMS service, and receive data via the at least one eMBMS service during operation of the MT in the data state.

Example 133 is the at least one non-transitory computer-readable storage medium of Example 131, the first AT command to cause the MT to monitor a multicast control channel (MCCH).

Example 134 is the at least one non-transitory computer-readable storage medium of Example 133, comprising instructions that, in response to being executed on the computing device, cause the computing device to send a fifth AT command to disable eMBMS support at the MT, the fifth AT command to cause the MT to refrain from monitoring the MCCH.

Example 135 is the at least one non-transitory computer-readable storage medium of Example 131, comprising instructions that, in response to being executed on the computing device, cause the computing device to send a sixth AT command to enable presentation of an unsolicited result code for reporting eMBMS session parameter values.

Example 136 is the at least one non-transitory computer-readable storage medium of Example 131, comprising instructions that, in response to being executed on the computing device, cause the computing device to send a seventh AT command to query the MT regarding eMBMS services used by the MT.

Example 137 is the at least one non-transitory computer-readable storage medium of Example 136, comprising instructions that, in response to being executed on the computing device, cause the computing device to receive information describing one or more used eMBMS services in response to the seventh AT command, and send an eighth AT command to de-configure use of at least one of the one or more used eMBMS services by the MT.

Example 138 is the at least one non-transitory computer-readable storage medium of Example 131, comprising instructions that, in response to being executed on the computing device, cause the computing device to send a ninth AT command to provide the MT with a list of temporary mobile group identities (TMGIs) associated with eMBMS services of interest.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a memory; and
    logic, at least a portion of which is in circuitry coupled to the memory, the logic to:

enable provision of evolved Multimedia Broadcast Multicast Service (eMBMS) support by a mobile termination (MT) in response to a +CEMBMSCFG AT command received from terminal equipment (TE);

send a list of eMBMS services to the TE in response to a first +CEMBMSSRV AT command received from the TE, the list of eMBMS services to identify one or more eMBMS services available for use by the MT; and configure an eMBMS service for use by the MT in response to a second +CEMBMSSRV AT command received from the TE.

2. The apparatus of claim 1, the configured eMBMS service to be comprised among the one or more eMBMS services identified by the list of eMBMBs services.

3. The apparatus of claim 1, the logic to configure a channel for data transfer for an eMBMS session associated with the configured eMBMS service in response to a +CEMBMSDATA AT command received from the TE.

4. The apparatus of claim 3, the +CEMBMSDATA AT command to include an <embms_session_id> parameter to indicate an eMBMS Session Identity associated with the eMBMS session.

5. The apparatus of claim 1, the first +CEMBMSSRV AT command to include an <embms_service> parameter comprising a value of 0.

6. The apparatus of claim 1, the second +CEMBMSSRV AT command to include an <embms_service> parameter comprising a value of 2.

7. The apparatus of claim 1, the logic to send a list of eMBMS services being used by the MT in response to a third +CEMBMSSRV AT command received from the TE, the third +CEMBMSSRV AT command to include an <embms_service> parameter comprising a value of 1.

8. The apparatus of claim 1, the logic to deconfigure the configured eMBMS service in response to a fourth +CEMBMSSRV AT command received from the TE, the fourth +CEMBMSSRV AT command to include an <embms_service> parameter comprising a value of 3.

9. The apparatus of claim 1, the +CEMBMSCFG AT command received from the TE via a terminal adapter (TA).

10. At least one non-transitory computer-readable storage medium comprising a set of instructions that, in response to being executed on terminal equipment (TE), cause the TE to:

send a first +CEMBMSSRV AT command to request a list of evolved Multimedia Broadcast Multicast Service (eMBMS) services available for use by a mobile termination (MT);

receive the list of eMBMS services in a received response to the first +CEMBMSSRV AT command;

select an eMBMS service from among one or more eMBMS services identified by the list of eMBMS services; and send a second +CEMBMSSRV AT command to configure the selected eMBMS service for use by the MT.

11. The at least one non-transitory computer-readable storage medium of claim 10, comprising instructions that, in response to being executed on the TE, cause the TE to send a +CEMBMSCFG AT command to enable eMBMS support at the MT.

12. The at least one non-transitory computer-readable storage medium of claim 10, comprising instructions that, in response to being executed on the TE, cause the TE to send a +CEMBMSDATA AT command to configure a channel for data transfer for an eMBMS session associated with the selected eMBMS service.

13. The at least one non-transitory computer-readable storage medium of claim 12, the +CEMBMSDATA AT command to include an <embms_session_id> parameter to indicate an eMBMS Session Identity associated with the eMBMS session.

14. The at least one non-transitory computer-readable storage medium of claim 10, the first +CEMBMSSRV AT command to include an <embms_service> parameter comprising a value of 0.

15. The at least one non-transitory computer-readable storage medium of claim 10, the second +CEMBMSSRV AT command to include an <embms_service> parameter comprising a value of 2.

16. The at least one non-transitory computer-readable storage medium of claim 10, comprising instructions that, in response to being executed on the TE, cause the TE to send a third +CEMBMSSRV AT command to query eMBMS services being used by the MT, the third +CEMBMSSRV AT command to include an <embms_service> parameter comprising a value of 1.

17. The at least one computer-readable storage medium of claim 10, comprising instructions that, in response to being executed on the TE, cause the TE to send a fourth +CEMBMSSRV AT command to deconfigure the selected eMBMS service, the fourth +CEMBMSSRV AT command to include an <embms_service> parameter comprising a value of 3.

18. At least one non-transitory computer-readable storage medium comprising a set of instructions that, in response to being executed by processing circuitry of a mobile termination (MT), cause the MT to:

enable provision of evolved Multimedia Broadcast Multicast Service (eMBMS) support by the MT in response to a +CEMBMSCFG AT command received from terminal equipment (TE);

send a list of eMBMS services to the TE in response to a first +CEMBMSSRV AT command received from the TE, the list of eMBMS services to identify one or more eMBMS services available for use by the MT; and configure an eMBMS service for use by the MT in response to a second +CEMBMSSRV AT command received from the TE.

19. The at least one non-transitory computer-readable storage medium of claim 18, the configured eMBMS service to be comprised among the one or more eMBMS services identified by the list of eMBMBs services.

20. The at least one non-transitory computer-readable storage medium of claim 18, comprising instructions that, in response to being executed by processing circuitry of the MT, cause the MT to configure a channel for data transfer for an eMBMS session associated with the configured eMBMS service in response to a +CEMBMSDATA AT command received from the TE.

21. The at least one non-transitory computer-readable storage medium of claim 20, the +CEMBMSDATA AT command to include an <embms_session_id> parameter to indicate an eMBMS Session Identity associated with the eMBMS session.

22. The at least one non-transitory computer-readable storage medium of claim 18, the first +CEMBMSSRV AT command to include an <embms_service> parameter comprising a value of 0.

23. The at least one non-transitory computer-readable storage medium of claim 18, the second +CEMBMSSRV AT command to include an <embms_service> parameter comprising a value of 2.

24. The at least one non-transitory computer-readable storage medium of claim 18, comprising instructions that, in response to being executed by processing circuitry of the MT, cause the MT to send a list of eMBMS services being used by the MT in response to a third +CEMBMSSRV AT command received from the TE, the third +CEMBMSSRV AT command to include an <embms_service> parameter comprising a value of 1.

25. The at least one non-transitory computer-readable storage medium of claim 18, comprising instructions that, in response to being executed by processing circuitry of the MT, cause the MT to deconfigure the configured eMBMS service in response to a fourth +CEMBMSSRV AT command received from the TE, the fourth +CEMBMSSRV AT command to include an <embms_service> parameter comprising a value of 3.

* * * * *